(12) United States Patent
Flament et al.

(10) Patent No.: US 12,361,308 B2
(45) Date of Patent: Jul. 15, 2025

(54) SYSTEMS AND METHODS FOR REAL-TIME POLARIZATION DRIFT COMPENSATION IN OPTICAL FIBER CHANNELS USED FOR QUANTUM COMMUNICATIONS

(71) Applicant: Qunnect, Inc., Brooklyn, NY (US)

(72) Inventors: Mael Flament, Brooklyn, NY (US); Mehdi Namazi, Brooklyn, NY (US); Rourke Sekelsky, Brooklyn, NY (US); Gabriel Bello Portmann, Port Jefferson, NY (US)

(73) Assignee: Qunnect, Inc., Brooklyn, NY (US)

( * ) Notice: Subject to any disclaimer, the term of this patent is extended or adjusted under 35 U.S.C. 154(b) by 107 days.

(21) Appl. No.: 18/024,715

(22) PCT Filed: Sep. 3, 2021

(86) PCT No.: PCT/US2021/049052
§ 371 (c)(1),
(2) Date: Mar. 3, 2023

(87) PCT Pub. No.: WO2022/086634
PCT Pub. Date: Apr. 28, 2022

(65) Prior Publication Data
US 2023/0342649 A1    Oct. 26, 2023

Related U.S. Application Data

(60) Provisional application No. 63/075,060, filed on Sep. 4, 2020.

(51) Int. Cl.
*G06N 10/40*    (2022.01)
*G02F 1/01*    (2006.01)
(Continued)

(52) U.S. Cl.
CPC .......... *G06N 10/40* (2022.01); *G02F 1/0136* (2013.01); *H04B 10/0795* (2013.01); *H04B 10/2572* (2013.01); *H04B 10/532* (2013.01)

(58) Field of Classification Search
CPC .. G06N 10/40; G02F 1/0136; H04B 10/0795; H04B 10/2572; H04B 10/532
(Continued)

(56) References Cited

U.S. PATENT DOCUMENTS 4,389,090 A    6/1983  LeFevre
4,729,662 A    3/1988  O'Brien
(Continued)

FOREIGN PATENT DOCUMENTS

WO    WO 2019/191442 A1    10/2019

OTHER PUBLICATIONS

Extended European Search Report dated Aug. 12, 2024, in connection with European Application No. 21883486.9.
(Continued)

*Primary Examiner* — Dalzid E Singh
(74) *Attorney, Agent, or Firm* — Wolf, Greenfield & Sacks, P.C.

(57) ABSTRACT

Systems and methods for performing polarization compensation in optical fiber-based quantum telecommunications systems are provided. The system includes a polarization modulator optically coupled to a photon source by an optical fiber and at least one controller coupled to the polarization modulator. The at least one controller is configured to determine, using a machine learning model and/or a lookup table, a feedback parameter based on one or more measurements of a polarization of probe photons at a location along the optical fiber, the probe photons being generated by the photon source; and using the feedback parameter, to change a setting of the polarization modulator to change a polar-
(Continued)

ization of quantum data photons propagating in the optical fiber subsequent to the probe photons.

25 Claims, 13 Drawing Sheets

(51) Int. Cl.
  *H04B 10/079* (2013.01)
  *H04B 10/2507* (2013.01)
  *H04B 10/532* (2013.01)
(58) Field of Classification Search
  USPC .......................................... 398/152
  See application file for complete search history.

(56) References Cited

U.S. PATENT DOCUMENTS

| | | | | |
|---|---|---|---|---|
| 6,522,749 | B2 * | 2/2003 | Wang | H04L 9/0852 |
| | | | | 380/263 |
| 8,265,280 | B2 * | 9/2012 | Lee | H04B 10/70 |
| | | | | 380/278 |
| 2002/0089723 | A1 * | 7/2002 | Patel | G02B 6/266 |
| | | | | 398/152 |
| 2003/0020925 | A1 * | 1/2003 | Patel | G01D 5/345 |
| | | | | 356/519 |
| 2007/0116286 | A1 | 5/2007 | Yuan et al. | |
| 2011/0216311 | A1 | 9/2011 | Kachanov et al. | |
| 2011/0280405 | A1 | 11/2011 | Habif | |
| 2013/0083925 | A1 | 4/2013 | Nordholt et al. | |
| 2014/0369374 | A1 | 12/2014 | Huber et al. | |
| 2015/0236791 | A1 * | 8/2015 | Nordholt | H04B 10/501 |
| | | | | 398/184 |
| 2016/0026930 | A1 * | 1/2016 | Cheng | G06N 5/02 |
| | | | | 706/11 |
| 2017/0222731 | A1 | 8/2017 | Lucamarini et al. | |
| 2017/0343750 | A1 | 11/2017 | Ashrafi | |
| 2018/0287710 | A1 * | 10/2018 | Komatsu | G02B 6/4292 |
| 2019/0393965 | A1 | 12/2019 | Zhang et al. | |

OTHER PUBLICATIONS

Han et al., Breakthrough leading to A New Type of E-O Materials Electro-Elasto-Optical Properties of EEO Crystals (PMN-PT based relax ferroelectric Crystals) by Special Modifications. EE Optics Corporation. Conference on Lasers and Elctro-Optics. Jan. 1, 2018. 2 pages.

U.S. Appl. No. 18/021,986, filed Feb. 17, 2023, Namazi et al.

PCT/US2021/049052, May 12, 2022, International Search Report and Written Opinion.

PCT/US2021/46507, Dec. 8, 2021, International Search Report and Written Opinion.

PCT/US2021/049052, Mar. 16, 2023, International Preliminary Report on Patentability.

PCT/US2021/46507, Mar. 2, 2023, International Preliminary Report on Patentability.

International Search Report and Written Opinion dated May 12, 2022, in connection with International Application No. PCT/US2021/049052.

International Search Report and Written Opinion dated Dec. 8, 2021, in connection with International Application No. PCT/US2021/46507.

International Preliminary Report on Patentability dated Mar. 16, 2023, in connection with International Application No. PCT/US2021/049052.

[No Author Listed], Quantum Networks for Open Science Workshop. DOE. Sep. 25-26, 2018. https://info.ornl.gov/sites/publications/Files/Pub124247.pdf [last accessed Mar. 20, 2023] 43 pages.

[No Author Listed], A Strategic Vision For America's Quantum Networks. The White House's National Quantum Coordination Office. Feb. 2020. 4 pages.

Baumeister et al., Deep Learning and model predictive control for self-tuning mode-locked lasers. ArXiv:1711.02702. 2018. pp. 617-626.

Doster et al., Machine learning approach to OAM beam demultiplexing via convolutional neural networks. Applied Optics. Apr. 20, 2017;56(12). 11 pages.

Gregor et al., Temporal difference variational auto-encoder. ArXiv:1806.03107. Jan. 2, 2019. 17 pages.

Higgins et al., Practical Polarization-Frame Alignment For Quantum Key Distribution With Single-Photon-Level Resources. Oct. 9, 2018. 11 pages. arXiv:1810.04112.

Ma et al., Polarization Recovery and Auto-Compensation in Quantum Key Distribution Network. Quantum Communications and Quantum Imaging IV. SPIE. Aug. 30, 2006;6305(630513). 7 pages. doi:10.1117/142.679575.

Yu et al., Reconstruction of a Photonic Qubit State With Reinforcement Learning. Advanced. Quantum Technologies. 2019;2(1800074). 6 pages. doi:10.1002/qute.201800074.

Xavier et al., Experimental Polarization Encoded Quantum Key Distribution Over Optical Fibers With Real-Time Continuous Birefringence Compensation. New J. Phys. Apr. 30, 2009;11(045015). 14 pages. doi:10.1088/1367-2630/11/4/045015.

Xin et al., Local-Measurement-Based Quantum State Tomography Via Neural Networks. npj Quantum Information. 2019;5(109). 8 pages. doi.org/10.1038/s41534-019-0222-3.

EP 21883486.9, Aug. 12, 2024, Ectended European Search Report.

* cited by examiner

SYSTEMS AND METHODS FOR REAL-TIME POLARIZATION DRIFT COMPENSATION IN OPTICAL FIBER CHANNELS USED FOR QUANTUM COMMUNICATIONS

FEDERALLY SPONSORED RESEARCH

This invention was made with government support under FA8649-21-P0775 awarded by the United States Air Force. The government has certain rights in the invention.

CROSS-REFERENCE TO RELATED APPLICATIONS

This application is a national stage filing under 35 U.S.C. § 371 of International Patent Application Serial No. PCT/US2021/049052, filed Sep. 3, 2021, and titled "SYSTEMS AND METHODS FOR REAL-TIME POLARIZATION DRIFT COMPENSATION IN OPTICAL FIBER CHANNELS USED FOR QUANTUM COMMUNICATIONS", which claims priority under 35 U.S.C. § 119 (e) to U.S. Provisional Application Ser. No. 63/075,060, filed Sep. 4, 2020, and titled "POLARIZATION DRIFT COMPENSATION," each of which is incorporated by reference herein in its entirety.

BACKGROUND

Quantum networks facilitate the transmission of information in the form of quantum bits ("qubits") between physically separated quantum processors or other quantum devices (e.g., quantum sensors). Quantum networks may be used to enable optical quantum communication over distances and can be implemented over standard telecommunication optical fibers through the transmission of single photons onto which information is encoded (e.g., in polarization). To enable the reliable transmission of quantum information over any distances, additional components may be needed.

SUMMARY

Some embodiments provide for a system. The system comprises a polarization modulator optically coupled to a photon source by an optical fiber and at least one controller coupled to the polarization modulator. The at least one controller is configured to: determine, using a machine learning model and/or a lookup table, a feedback parameter based on one or more measurements of a polarization of probe photons at a location along the optical fiber, the probe photons being generated by the photon source; and using the feedback parameter, change a setting of the polarization modulator to change a polarization of quantum data photons propagating in the optical fiber subsequent to the probe photons.

In some embodiments, the polarization modulator comprises a plurality of modulating components inserted sequentially along a length of the optical fiber, at least one of the modulating components being electromechanically controlled. In some embodiments, the plurality of modulating components comprises a spool having a diameter about which one or more loops of the optical fiber are wound and wherein the spool is configured to act as a quarter or half waveplate. In some embodiments, changing the setting of the polarization modulator using the feedback parameter comprises using an electrical signal to change a rotation of the spool, the rotation of the spool causing a mechanical stress in the optical fiber and a change in a birefringence of the optical fiber. In some embodiments, changing the birefringence of the optical fiber induces a change in a polarization of the quantum data photons in the optical fiber.

In some embodiments, the plurality of modulating components comprises a spool around which the optical fiber is wound in a Soleil-Babinet configuration. In some embodiments, changing the setting of the polarization modulator using the feedback parameter comprises using an electrical signal to change a diameter of the spool, the change in the diameter of the spool causing a mechanical stress in the optical fiber and a change in a birefringence of the optical fiber. In some embodiments, changing the birefringence of the optical fiber induces a change in a polarization of the quantum data photons in the optical fiber.

In some embodiments, the polarization modulator comprises an optical material, and wherein using the feedback parameter comprises applying an electric field to the optical material to modulate a birefringence of the optical material to induce a change in a polarization of the quantum data photons in the optical fiber. In some embodiments, the optical material comprises an electro-elasto-optical (EEO) material.

In some embodiments, the photon source is configured to generate the probe photons such that the probe photons propagate along the optical fiber in a same direction as the quantum data photons.

In some embodiments, the photon source is configured to generate the probe photons such that the probe photons propagate along the optical fiber in an opposite direction as the quantum data photons.

In some embodiments, the system further comprises at least one polarimeter coupled to the polarization modulator and configured to produce the one or more measurements of the polarization of the probe photons at the polarization modulator. In some embodiments, the at least one polarimeter is coupled to each of the plurality of modulating components, and wherein the one or more measurements of the polarization of the probe photons comprise measurements of a polarization of the probe photons at an output of each of the plurality of modulating components.

In some embodiments, the at least one controller is further configured to: determine a difference between an initial polarization of the probe photons as produced by the photon source and a final polarization of the probe photons as measured at an output of the polarization modulator, and wherein, determining the feedback parameter based on one or more measurements of the polarization of the probe photons comprises determining the feedback parameter based on the difference between the initial polarization and the final polarization.

In some embodiments, the initial polarization and the final polarization are each characterized by a set of three vectors, and the difference between the initial polarization and the final polarization comprises a difference between vectors of each set of three vectors. In some embodiments, the set of three vectors is measured by a polarimeter comprising one or more rotating waveplates and a detector. In some embodiments, the set of three vectors is measured by a fixed assembly, the fixed assembly comprising: at least six beamsplitters; three polarized beamsplitters optically coupled to outputs of beamsplitters of the at least six beamsplitters; and pairs of optical detectors, wherein optical detectors of each pair of optical detectors are optically coupled and incident to an output of a polarized beamsplitter of the three polarized beamsplitters.

In some embodiments, the quantum data photons comprise at least one of a sequence of unentangled single photons and/or a sequence of entangled single photons.

In some embodiments, the polarization modulator comprises a first polarization modulator and a second polarization modulator, the photon source comprises a first photon source optically coupled to the first polarization modulator and a second photon source optically coupled to the second polarization modulator, the at least one controller comprises a first local controller, a second local controller, and a global controller, the first local controller is communicatively coupled to the first polarization modulator and the second local controller is communicatively coupled to the second polarization modulator, and the global controller is communicatively coupled to the first and second polarization modulators. In some embodiments, the global controller is configured to determine the feedback parameter using the machine learning model, and the first and second local controllers are configured to change a setting of the first and/or second polarization modulators using the feedback parameter.

In some embodiments, the at least one controller is further configured to reduce downtime of the system by: determining, using a time series forecasting model, when to initiate the steps of determining the feedback parameter and changing the setting of the polarization modulator. In some embodiments, determining when to initiate the steps of determining the feedback parameter and changing the setting of the polarization modulator comprises determining when to initiate the steps based on previously-measured polarization information.

Some embodiments provide for a method for correcting a polarization of one or more photons. The method comprises: determining a difference between an initial polarization of the one or more photons at a photon source configured to produce the one or more photons and a final polarization of the one or more photons after propagating through a length of optical fiber; determining, using a machine learning model and/or a lookup table, a feedback parameter based on the difference between the initial polarization and the final polarization; and using the feedback parameter, changing a parameter of a polarization modulator coupled to the optical fiber to change a polarization of subsequent photons at the polarization modulator.

In some embodiments, the method further comprises generating, using the photon source, the one or more photons such that the one or more photons propagate in a same direction along the optical fiber as signal photons. In some embodiments, the method further comprises generating, using the photon source, the one or more photons such that the one or more photons propagate in an opposite direction along the optical fiber as signal photons.

In some embodiments, the photon source is configured to generate the one or more photons on demand such that the one or more photons are an only optical signal in the optical fiber for a period of time.

In some embodiments, the method further comprises regulating optical signals in the optical fiber using an optical fiber switch, a wavelength division multiplexer, and/or an optical circulator.

In some embodiments, the initial polarization and the final polarization are each characterized by a set of three vectors, and the difference between the initial polarization and the final polarization comprises a difference in one or more values of vectors of each set of three vectors. In some embodiments, the difference comprises a quantum bit error rate.

In some embodiments, the machine learning model is trained using one of a policy, a reward table, or backpropagation and a training data set comprising correlated input polarization values, polarization modulator configuration values, and output polarization values. In some embodiments, the training data set is determined based on measurements of output polarization values for two or more defined input polarization values.

In some embodiments, the two or more defined input polarization values include two or more of H, V, D, A, and/or R/L polarization values.

In some embodiments, changing a parameter of the polarization modulator comprises changing a rotation of one or more spools of the polarization modulator in order to change a birefringence of the optical fiber and to change a polarization of the subsequent photons, wherein each spool configured to act as a quarter or half waveplate and comprising a diameter about which one or more loops of the optical fiber are wound.

In some embodiments, changing a parameter of the polarization modulator comprises changing, using an electrical signal, a diameter of a spool around which the optical fiber is wound in a Soleil-Babinet configuration, the change in diameter of the spool causing a mechanical stress in the optical fiber, a change in a birefringence of the optical fiber, and a change in a polarization of the subsequent photons.

In some embodiments, changing a parameter of the polarization modulator comprises changing a magnitude of an applied electric field to an optical material coupled to the optical fiber in order change a birefringence of the optical material and change a polarization of the subsequent photons.

In some embodiments, determining the difference between the initial polarization and the final polarization comprises: interfering two groups of one or more photons originating from different synchronized photon sources; and measuring an interference pattern produced by interfering the two groups of one or more photons.

In some embodiments, the one or more photons comprise a first photon having a first initial polarization state and a second photon having a second initial polarization state, and determining the feedback parameter comprises determining the feedback parameter based on a difference between the first initial polarization and a first final polarization and a difference between the second initial polarization and a second final polarization.

Some embodiments provide a method for correcting a polarization of photons transmitted through an optical fiber. The method comprises: transmitting a sequence of photons including data photons and one or more probe photons through an optical fiber; measuring a polarization of the one or more probe photons after traversing the optical fiber; determining a difference between an initial polarization of the one or more probe photons and the measured polarization of the one or more probe photons; determining, using a machine learning model and/or lookup table, a feedback parameter based on the difference between the initial polarization and the measured polarization; and changing, using the feedback parameter, a parameter of a polarization modulator coupled to the optical fiber to correct a polarization of the data photons.

In some embodiments, transmitting the sequence of photons comprises transmitting the one or more probe photons at periodic intervals.

In some embodiments, transmitting the sequence of photons comprises transmitting the one or more probe photons in response to a triggering event. In some embodiments, the triggering event comprises a change in temperature exceeding a threshold value. In some embodiments, the triggering event comprises a change in the difference between the initial polarization and the measured polarization exceeding a threshold value. In some embodiments, the triggering event comprises a signal generated by a GPS-disciplined clock and/or a fiber-based network synchronization protocol.

In some embodiments, the method further comprises determining, based on previously-measured polarization drift data, a frequency of triggering events to cause transmission of the one or more probe photons.

In some embodiments, transmitting the sequence of photons comprises transmitting the one or more probe photons, the one or more probe photons comprising a first probe photon having a first defined polarization state and a second probe photon having a second defined polarization state different than the first polarization state.

In some embodiments, transmitting the sequence of photons comprises transmitting the one or more probe photons, the one or more probe photons having one or more wavelengths, the one or more wavelengths being different from a wavelength of the data photons.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
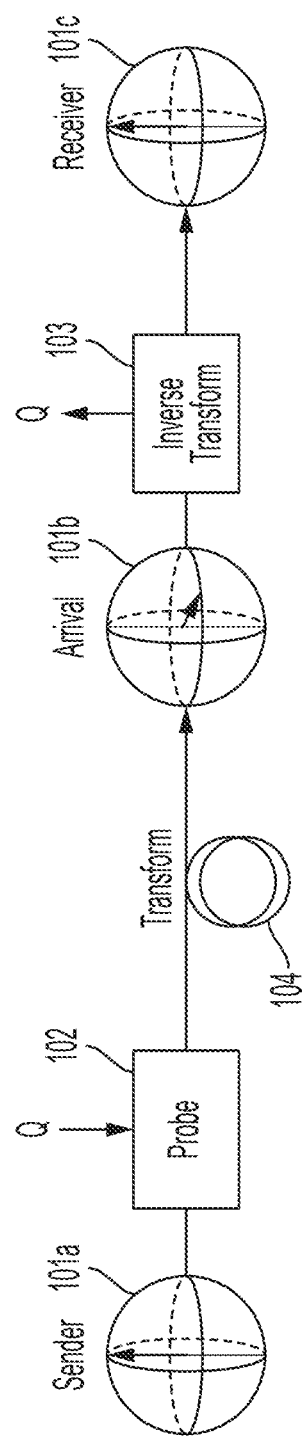
FIG. 1A is a schematic diagram of a quantum telecommunications system including polarization compensation, in accordance with some embodiments of the technology described herein.

Described herein are techniques for performing dynamic polarization fluctuation and/or drift correction to preserve the quantum information transmitted using single photons in quantum optical telecommunication systems. These techniques include the use of algorithms, including machine learning algorithms, to provide feedback regarding a state of a polarization modulator based on a measured difference between an initial, encoded photon polarization and a measured polarization of the photon after the photon has propagated along a length of optical fiber. The feedback may be used to change a setting of the polarization modulator in order to preserve a polarization of single photons, grouped photons, or other transmitted light (e.g., from a laser) as the photons are transmitted over a quantum telecommunications network. Such dynamic feedback preserves data fidelity and the quantum state of quantum data (e.g., qubits) over long-range quantum communications.

The successful implementation of quantum telecommunications networks which operate in the single-photon regime can only be achieved once methods for preserving the quantum state and phase of transmitted quantum data photons have been developed. Optical quantum communication methods transmit information using single photons or entangled pairs of single photons. The use of single photons presents numerous challenges for designing practical telecommunication protocols which must contend with effects that alter photon properties due to the physical nature of optical fibers. For example, photon polarization drift may occur as photons traverse the optical fiber due to changes in physical orientations of the optical fibers and/or birefringence effects due to stress and/or strain placed on the optical fibers.

Quantum-enabling technologies and ancillary components to support integration within existing network infrastructures are critical developments needed to facilitate early market adoption of quantum telecommunications. In photonic-based quantum networking applications, information is typically encoded in the State of Polarization (SOP) of photons. If optical fibers were ideal in nature, the signal SOP would remain constant as the photons traverse the optical fibers, eliminating the need for compensation methods. However, the SOP of light propagating in optical fibers varies along the length of the optical fibers due to random birefringence induced by thermal changes, mechanical stress, or material irregularities of the fiber core. Such fluctuations also lead to undesirable variations in the optical path length. This results in random fluctuations and/or drift of the photons' SOP.

As the majority of telecommunications infrastructure uses single-mode fibers that are not configured to maintain photon polarization, induced variations influence both polarization axes. A rapid polarization drift correction device could be devised to compensate for these effects, assuming these fluctuations are not too different along the two polarization axes (e.g. there are no phase fluctuations between polarization components). The inventors have recognized and appreciated that while such modules exist in classical telecommunication networks, they are only commercialized for specific wavelengths of light and, more importantly, do not work at single-photon levels as necessitated by quantum applications. Additionally, such commercial polarization compensation modules typically operate by removing a portion of the optical signal (e.g., using a beam splitter) to use for measurement and feedback. Such signal removal is not feasible in the quantum telecommunications regime because any loss of or disturbance to the quantum data signal renders the quantum telecommunication inoperable.

The inventors have further recognized and appreciated that machine learning techniques may aid in the performance of dynamic, fast polarization-frame alignments in the context of optical telecommunications (e.g., including quantum and non-quantum telecommunications). For example, the inventors have recognized that machine learning techniques can determine appropriate methods of polarization correction based on synchronized polarization state measurements. By training a machine learning model (e.g., a reinforcement learning algorithm, a dynamic programming algorithm) using training data correlating input and output photon polarization states with settings of a polarization modulator, the machine learning model can be trained to determine appropriate feedback parameters for the polarization modulator to maintain the photon polarization states over long-distance transmissions through optical fibers.

The inventors have further recognized and appreciated that machine learning techniques may be used to reduce or minimize downtime of a quantum telecommunications system. For example, the inventors have recognized that certain machine learning techniques can be trained to initiate automatic, real-time polarization compensation by making predictions of polarization drift based on historical polarization data. Such machine learning models (e.g., time series forecasting models) can be configured to make predictions ("forecast") with respect to regular or periodic points in time ("forecast points") when polarization measurements are obtained. Whenever the machine learning model predicts that the polarization drift and model error exceed a certain threshold, the network may be taken down for polarization compensation maintenance. By using a machine learning model to predict such network downtimes, rather than periodically forcing such downtimes, network downtime may be overall reduced.

Accordingly, the inventors have developed a dynamic qubit polarization drift compensation system for arbitrary-length optical channels capable of polarization state analysis with near real-time polarization correction. Some embodiments provide a system including a polarization modulator optically coupled to a photon source (e.g., a single photon source, a multi-photon source, or a light source such as a laser) by an optical fiber. The system includes a controller coupled to the polarization modulator, and the controller may be configured to determine, using a machine learning model, a feedback parameter based on one or more measurements of a polarization (e.g., as performed by a polarimeter) of photons at the polarization modulator after traversing a length of the optical fiber. The controller may be further configured to, using the feedback parameter, change a setting of the polarization modulator to correct the polarization of photons at the polarization modulator.

For example, in some embodiments the polarization modulator may be a fiber polarization controller including a spool having a diameter about which a portion of the optical fiber is wound. The controller may send the feedback parameter as a signal to an electromechanical controller of the spool, which may change a rotation of the spool to change a positioning of the optical fiber (e.g., to change a stress or strain on the optical fiber, inducing a change in the birefringence of the optical fiber). In some embodiments, this mechanical strain on the optical fiber may be caused by changing the diameter of a spool in a Soleil-Babinet configuration in response to the feedback parameter.

In some embodiments, the polarization modulator may include a non-linear optical material (e.g., beta barium borate (BBO), lithium niobate, ammonium dihydrogen phosphate (ADP), and/or any other suitable non-linear optical material), and the feedback parameter may be sent as a signal configured to change an electric field applied to the non-linear optical material, thereby inducing a change in the birefringence of the non-linear optical material. In some embodiments, the polarization modulator may include an electro-elasto-optical (EEO) material (e.g., a biaxial crystal perovskite ternary solid solution with a morphotropic phase boundary).

Some embodiments provide a method of correcting a polarization value of photons transmitted through the optical fiber. The method may include transmitting a sequence of photons or light pulses including data photons and one or more probe photons through an optical fiber. The probe photons, for example, may be encoded with a known initial polarization, and may be produced periodically (e.g., to be interweaved with quantum data photons) or in response to a triggering event (e.g., in response to a detected change in temperature, in response to the difference between the known initial polarization and a final polarization exceeding a threshold value, in response to a reduction or increase of the useful quantum operation rate (e.g., a change in the quantum bit error rate (QBER)). In some embodiments, the triggering event may be a signal generated by a GPS-disciplined clock and/or a fiber-based network synchronization protocol (e.g., a white rabbit protocol). The method may further include measuring a polarization of the one or more probe photons after traversing the optical fiber (e.g., by using a polarimeter), and determining a difference between an initial polarization of the one or more probe photons and the measured polarization of the one or more probe photons. The method may include determining, using a machine learning model and/or a lookup table, a feedback parameter based on the difference between the initial polarization and the measured polarization, and changing a parameter of a polarization modulator coupled to the optical fiber to correct for the difference between the initial polarization and the measured polarization.

In some embodiments, the method may include the relative calibration of two independent fiber channels. For entanglement-based operations within the network, photons may be interfered at a common location with photons provided by separate fiber channels. Photons of a known polarization may be transmitted through each fiber channel and interfered at the measurement station. The resulting interference pattern visibility may be used to improve the relative performance of one fiber channel with respect to the other fiber channel.

Following below are more detailed descriptions of various concepts related to, and embodiments of, techniques for implementing dynamic polarization drift correction for quantum telecommunications systems. It should be appreciated that various aspects described herein may be implemented in any of numerous ways. Examples of specific implementations are provided herein for illustrative purposes only. In addition, the various aspects described in the embodiments below may be used alone or in any combinations and are not limited to the combinations explicitly described herein.

FIG. 1A is a schematic diagram of a quantum telecommunications system including polarization compensation, in accordance with some embodiments of the technology described herein. A known polarization state 101a at the reference basis is generated by the probe photon source 102 and transmitted along an optical fiber 104. The optical fiber 104 may be long (e.g., tens of kilometers long, hundreds of kilometers long). At the arrival point (e.g., across the optical fiber 104), the polarization state 101b has undergone an arbitrary transformation due to optical fiber effects (e.g., material changes, thermal changes, etc.) along the propagation length of the optical fiber 104.

In some embodiments, a transform 103 is applied to the received polarization state 101b. The transform 103 preferably corresponds to an inverse of the unknown transform applied by the optical fiber 104. Thus, by applying the transform 103 to the received polarization state 101b, the initial known polarization state 101a can be retrieved as the final polarization state 101c. In this manner, the system can correct for polarization drift caused by changes in the optical fiber (e.g., thermal, mechanical, or other changes) and bring the probing light to its original known polarization state 101a. Because the quantum path, Q, is merged with the probe light, the polarization compensation also applies to any transmitted quantum data, thereby preserving the initial quantum state of the quantum data.

Figure 1B:
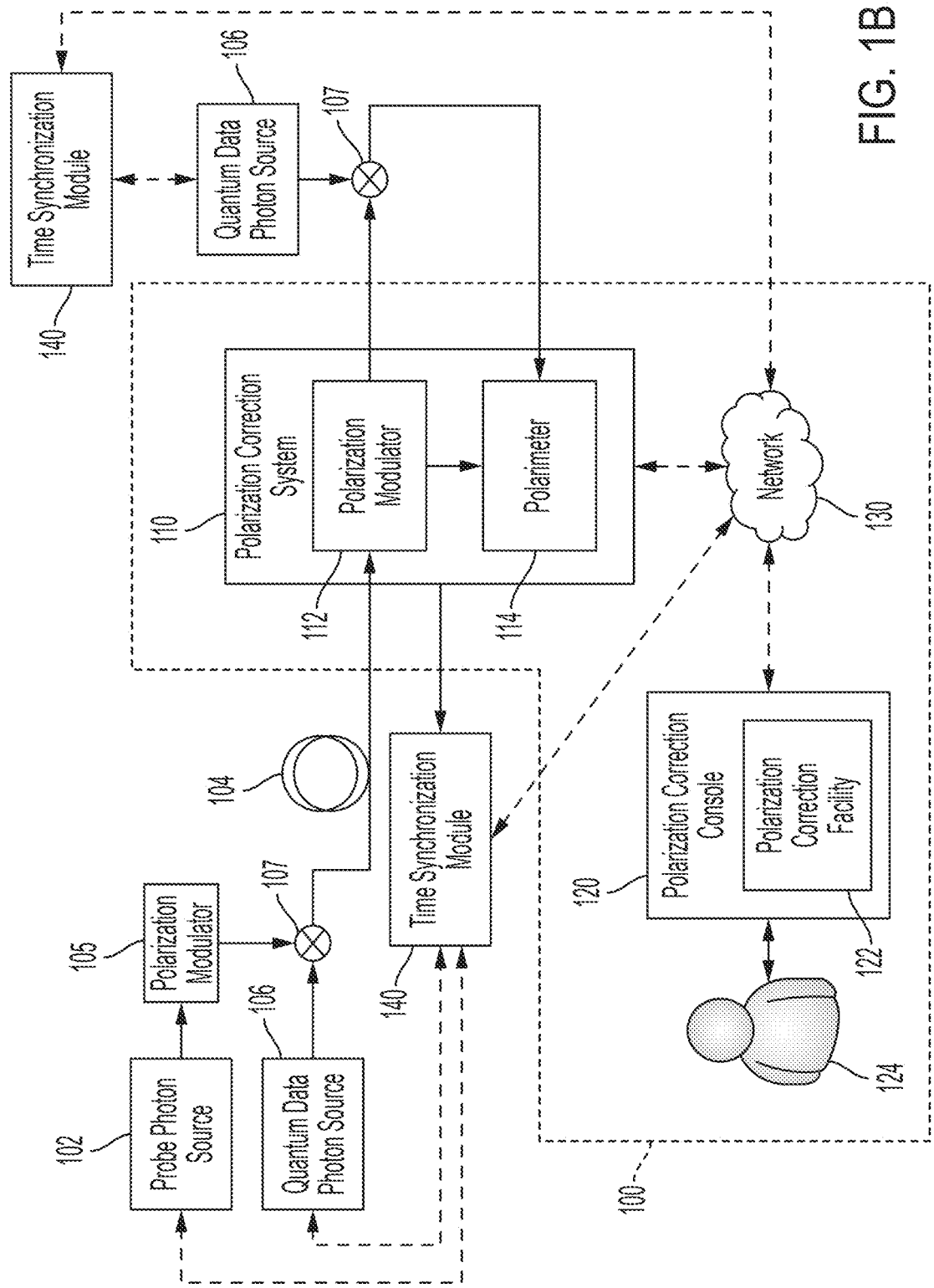
FIG. 1B is a schematic block diagram of a facility 100 for performing polarization correction, arranged such that quantum data photons and probe photons co-propagate along the optical fiber or counter-propagate along the optical fiber, respectively, in accordance with some embodiments of the technology described herein.

FIG. 1B is schematic block diagram of an example of a facility 100 for performing polarization correction, in accordance with embodiments described herein. In the example of FIG. 1B, probe photons are generated by probe photon source 102 and encoded with a known polarization state (e.g., H, V, D, A, R, and/or L polarization states) by polarization modulator 105. Polarization modulator 105 may be any suitable polarization modulator (e.g., a mechanical polarization modulator as described in connection with FIGS. 2A-2C herein, an electro-optic modulator (EOM), or a nonlinear optical material as described in connection with FIG. 2D herein). The photons generated by probe photon source 102, after being encoded with a known polarization state, then propagate along communications optical fiber 104 from left to right towards polarization correction system 110.

The example of FIG. 1B is drawn such that quantum data photons from quantum data photon source 106 may propagate along optical fiber 104 either from left-to-right (e.g., to "co-propagate" with the probe photons) or to propagate along optical fiber 104 from right-to-left (e.g., to "counter-propagate" relative to the probe photons). In either propagation scheme, quantum data photons from quantum data photon source 106 enter the communications optical fiber 108 through combiner 107 (e.g., any suitable optical combiner, wavelength division multiplexer (e.g., a dense wavelength division multiplexer), wavelength splitter, optical circulator, etc.). The quantum data photons are combined with the probe photons in the optical fiber 104. For example, the quantum data photons may be interleaved with the probe photons, in some embodiments.

In the illustrative example of FIG. 1B, facility 100 includes a polarization correction system 110 and a polarization correction console 120. It should be appreciated that facility 100 is illustrative and that a facility may have one or more other components of any suitable type in addition to or instead of the components illustrated in FIG. 1B. For example, there may be a remote system present within a facility and/or additional optical components may be present within a facility.

As illustrated in FIG. 1B, in some embodiments, the polarization correction system 110, the polarization correction console 120, and time synchronization modules 140 may be communicatively connected by a network 130. The time synchronization module 140 may include a GPS-disciplined clock, an optical fiber-based synchronization protocol (e.g., a white rabbit protocol or any other suitable optically distributed clock protocol), and/or a synchronized trigger (not shown) that are communicatively connected to the network 130. The time synchronization module 140 may be configured to generate and transmit a signal to the probe photon source 102 and/or the quantum data photon source 106, the signal configured to cause the probe photon source 102 to transmit a sequence of photons for use in polarization correction. The network 130 may be or include one or more local- and/or wide-area, wired and/or wireless networks, including a local-area or wide-area enterprise network and/or the Internet. Accordingly, the network 130 may be, for example, a hard-wired network (e.g., a local area network within a facility), a wireless network (e.g., connected over Wi-Fi and/or cellular networks), a cloud-based computing network, or any combination thereof. For example, in some embodiments, the polarization correction system 110 and the polarization correction console 120 may be located within a same facility and connected directly to each other or connected to each other via the network 130. In some embodiments, the time synchronization module 140 may be connected directly to the polarization correction console 120 and/or the polarization correction system 110.

In some embodiments, the polarization correction console 120 may be configured to determine feedback parameters of, adjust, and/or perform maintenance on a component within the polarization correction system 110. The polarization correction system 110 may include a polarization modulator 112 that receives photons from a probe photon source 102 and from a quantum data photon source 106 through an optical fiber 104. The probe photon source 102, the quantum data source 106, and/or the optical fiber 104 may be external to the facility 100, though it may be appreciated that the probe photon source 102, quantum data photon source 106, and/or the optical fiber 104 may be included in part of facility 100. The polarization correction system 110, the probe photon source 102, and/or the quantum data photon source 106 may be synchronized by GPS monitoring performed by time synchronization module 140. For example, time synchronization module 140 may calibrate the production of a photon by probe photon source 102 and/or quantum data photon source 106 and its reception at polarization correction system 110 by providing GPS data to polarization correction console 120, either directly or via the network 130.

In some embodiments, the polarization correction system 110 may further include a polarimeter 114 configured to measure a polarization of a photon and/or photons after passing through the polarization modulator 112 or after passing through a portion of the polarization modulator 112. It should be appreciated that some embodiments may include multiple polarization modulators 112 (e.g., embodiments including multiple optical fiber inputs may include additional polarization modulators not shown in the example of FIG. 1B).

In some embodiments, the probe photon source 102 and/or the quantum data photon source 106 may be photon sources configured to produce single photons, photon pairs, and/or few-photon pulses. In some embodiments, the probe photon source 102 and/or the quantum data photon source 106 may be a classical light source configured to produce multiple photons (e.g., a laser or other coherent light source).

In embodiments in which the probe photon source 102 and/or the quantum data photon source 106 are configured to produce photon pairs, the probe photon source 102 and/or the quantum data photon source 106 may further be configured to entangle the quantum states of the photons of the photon pair, although it is to be appreciated that unentangled photon pairs may also be produced by probe photon source 102 and/or quantum data photon source 106. For example, the probe photon source 102 and/or the quantum data photon source 106 may include a nonlinear optical material (e.g., beta barium borate (BBO), lithium niobate, ammonium dihydrogen phosphate (ADP), and/or any other suitable non-linear optical material) configured to entangle the states of the photons of the photon pair.

In some embodiments, the probe photon source 102 may be configured to generate one or more photons having different wavelengths. For example, the probe photon source 102 may be configured to generate photons having a wavelength greater than a wavelength of the quantum data photons and to generate photons having a wavelength less than a wavelength of the quantum data photons. For example, the probe photon source 102 may be configured to generate photons having a wavelength that is 50 nm greater than and photons having a wavelength that is 50 nm less than a wavelength of the quantum data photons (e.g., for quantum data photons having a wavelength of 1350 nm, the probe photon source 102 may generate probe photons having wavelengths of 1300 nm and 1400 nm).

In some embodiments, and as another example, the quantum data photon source 106 may be a quantum memory configured to store and transmit quantum data via entangled photon pairs. Additional aspects of a quantum memory that may be implemented as quantum data photon source 106 are described in U.S. Patent Application Publication No. 2021/0028865, filed Sep. 25, 2020 and titled "Devices, Systems, and Methods Facilitating Ambient-Temperature Quantum Information Buffering, Storage, and Communication," which is incorporated by reference herein in its entirety.

In some embodiments, the polarization modulator 112 may be configured to change the polarization of photons traveling along the optical fiber by applying a mechanical stress and/or strain on a portion of the optical fiber to change a birefringence of the portion of the optical fiber. Examples of components that can apply a mechanical stress and/or strain to a portion of the optical fiber and that may be included in polarization modulator 112 are shown in FIGS. 2A, 2B, and 2C.

Figure 2A:
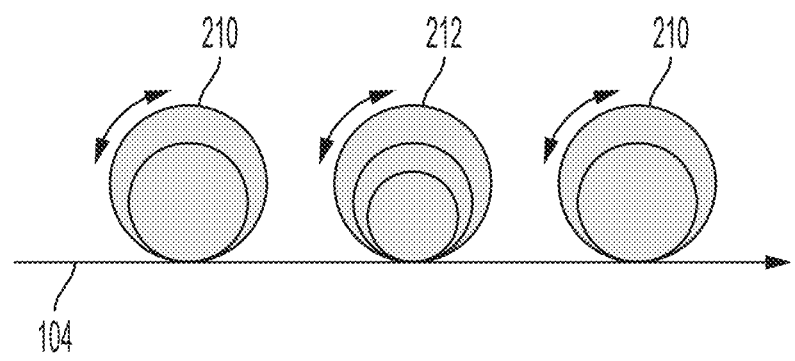
FIG. 2A is a schematic diagram of a polarization modulator including rotating paddles, in accordance with some embodiments of the technology described herein.
Figure 2B:
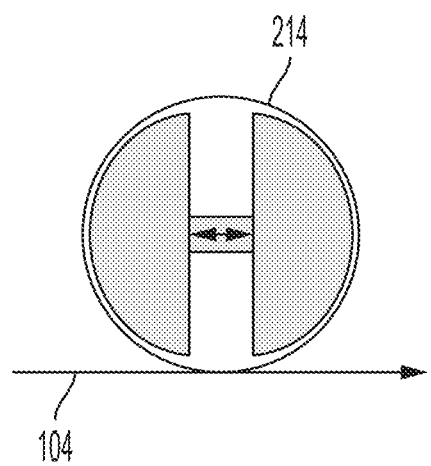
FIG. 2B is a schematic diagram of a polarization modulator including a spool and optical fiber wound in a Soleil-Babinet configuration, in accordance with some embodiments of the technology described herein.
Figure 2C:
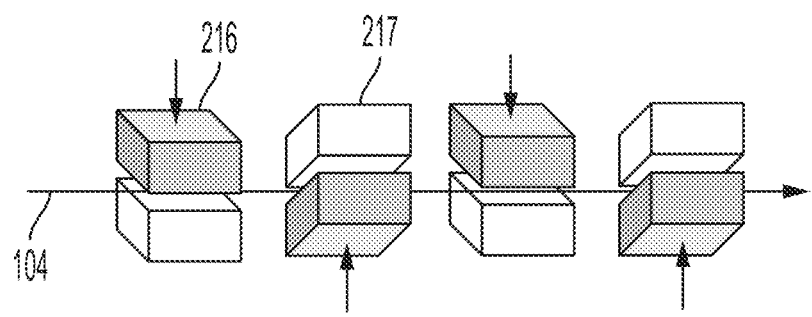
FIG. 2C is a schematic diagram of a polarization modulator including piezoelectric clamps, in accordance with some embodiments of the technology described herein.

FIG. 2A is a schematic diagram of a polarization modulator including an optical fiber polarization controller including electromechanically-rotatable paddles, in accordance with some embodiments of the technology described herein. The optical fiber polarization controller of FIG. 2A includes one or more spools of optical fiber mounted on electromechanically-controlled spools or paddles inserted sequentially along a length of the optical fiber 104. The spools have diameters about which the optical fiber 104 may be wound.

In some embodiments, the spools may be configured to act as quarter or half waveplates. In some embodiments, the polarization modulator 112 may include three spools, with two spools 210 configured as quarter waveplates and one spool 212, placed in between the other two spools 210, configured as a half waveplate. It should be appreciated that in some embodiments, the polarization modulator 112 may include any suitable number of spools configured with any suitable values of retardances.

In some embodiments, rotating the spools 210, 212 may change a mechanical stress and/or strain on the wound portion of the optical fiber 104, changing a birefringence of the wound portion of the optical fiber 104 and changing the polarization of light as it passes through the polarization modulator 112. The spools may be automatically rotated to any desired position using an electromechanical motor. The electromechanical motor may rotate one or more spools of the polarization modulator in response to receiving a feedback signal from the polarization correction console 120.

FIG. 2B is a schematic diagram of a polarization modulator including a spool and optical fiber wound in a Soleil-Babinet configuration, in accordance with some embodiments of the technology described herein. The spool 214 has an adjustable diameter about which the optical fiber 104 may be wound. In some embodiments, changing the diameter of the spool 214 may change a mechanical stress and/or strain on the would portion of the optical fiber 104, thereby changing a birefringence of the wound portion of the optical fiber 104 and the polarization of light as it passes through the polarization modulator 112. The diameter of the spool 214 may be automatically changed using an electromechanical motor. The electromechanical motor may change the diameter of the spool 214 in response to receiving a feedback signal from the polarization correction console 120.

FIG. 2C is a schematic diagram of a polarization modulator including piezoelectric clamps, in accordance with some embodiments of the technology described herein. The piezoelectric clamps 216, 217 may include one or more pairs of piezoelectric plates arranged such that the optical fiber 104 is disposed between the piezoelectric plates. As shown in the example of FIG. 2C, there may be four piezoelectric clamps 216, 217 disposed along a length of the optical fiber 104. It should be appreciated, however, that any suitable number (e.g., one, two, three, four, more than four, etc.) of piezoelectric clamps 216, 217 may be disposed along the length of the optical fiber 104, as aspects of the technology described herein are not limited in this respect.

The piezoelectric clamps may further be arranged such that first piezoelectric clamps 216 are disposed in a first plane and second piezoelectric clamps 217 are disposed in a second plane at an angle (e.g., at 45°) relative to the first plane. It should be appreciated that any suitable angle between the second plane and the first plane may be used, as aspects of the technology described herein are not so limited.

In some embodiments, the piezoelectric clamps 216, 217 may be configured to apply pressure to the portion of the optical fiber 104 disposed between the piezoelectric plates of the piezoelectric clamps 216, 217. Changing the pressure on the portions of the optical fiber 104 may change a birefringence of the portions of the optical fiber 104 disposed between the piezoelectric plates of the piezoelectric clamps 216, 217. Accordingly, changing the pressure on the portions of the optical fiber 104 may change a polarization of photons passing through the optical fiber 104. In some embodiments, the piezoelectric clamps 216, 217 may be configured to apply pressure by expanding or to remove pressure by contracting in response to a received electrical signal (e.g., an applied electric field). The received electrical signal may be a feedback signal from the polarization correction console 120.

In some embodiments, the polarization modulator 112 may include an optical material having a tunable birefringence. For example, the polarization modulator 112 may include an optical material (e.g., e.g., beta barium borate (BBO), lithium niobate, ammonium dihydrogen phosphate (ADP), and/or any other suitable non-linear optical material). The optical material may be birefringent (e.g., it may have a refractive index that is dependent on a polarization and propagation direction of the light passing through the nonlinear optical material). In some embodiments, the birefringence of the optical material may be tuned by a tuning parameter (e.g., temperature, applied electric fields, etc.). Tuning the birefringence of the optical material (e.g., by changing a temperature or an applied electric field) of polarization modulator 112 may be used to change the polarization of light passing through the polarization modulator 112.

Figure 2D:
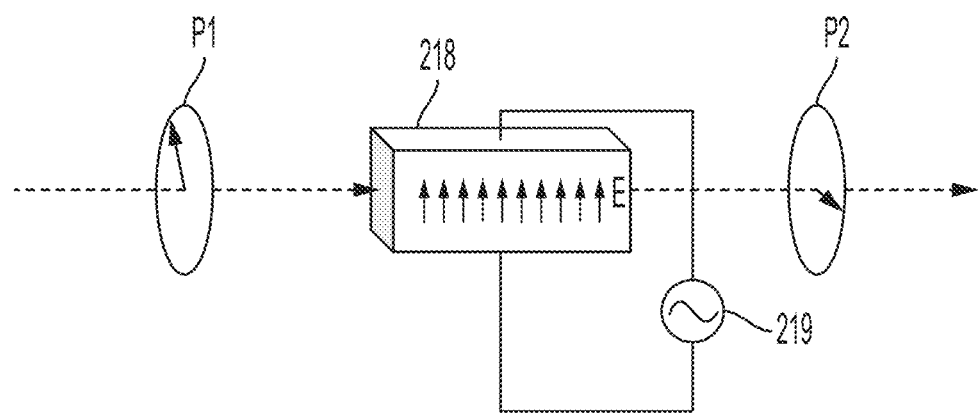
FIG. 2D is a schematic diagram of a polarization modulator including an optical material, in accordance with some embodiments of the technology described herein.

As an example, FIG. 2D is a schematic diagram of a polarization modulator including an optical material 218 (e.g., a linear optical material, a nonlinear optical material) having a birefringence tunable by the application of an electric field, in accordance with some embodiments of the technology described herein. For example, the optical material 218 may be an electro-optical modulator (EOM), a Pockels cell, and/or an electro-elasto-optical (EEO) material. The EEO material may be, for example, a biaxial optical crystal having a structure of a perovskite ternary solid solution with a morphotropic phase boundary. For example, the EEO material may have a chemical formula of the form $ABO_3$, where the B-site is occupied by one or more of Sb, Ti, In, Mg, and/or Nb.

In some embodiments, the optical material 219 may be used to change the polarization of photons traveling along the optical fiber by changing the birefringence of a portion of the optical path including the optical material 218. For example, applying an electric field (e.g., using current source 219) to the optical material 218 may cause the optical material 218 to experience a change in its birefringence due to a change in an internal electric field, E, caused by, for example, the linear electro-optic effect. This change in the optical material's birefringence then modulates the polarization of photons traveling along the optical fiber. As can be seen in FIG. 2D, photons enter the optical material 218 having a polarization state P1 and exit the optical material 218 having an altered polarization state P2. In some embodiments, the applied electric field may be a feedback signal from the polarization correction console 120.

Returning to FIG. 1B, in some embodiments, the polarimeter 114 may be configured to provide a measurement signal indicating a polarization of photons after they have passed through the polarization modulator 112. Alternatively or additionally, the polarimeter 114 may be configured to provide one or more measurement signals indicating a polarization of photons after passing through different portions of the polarization modulator 112 (e.g., after each spool for the example of the optical fiber polarization controller of FIG. 2A). The measurement signal may be transmitted to, for example, polarization correction console 120 in order to determine appropriate feedback to the polarization modulator 112.

Figure 3:
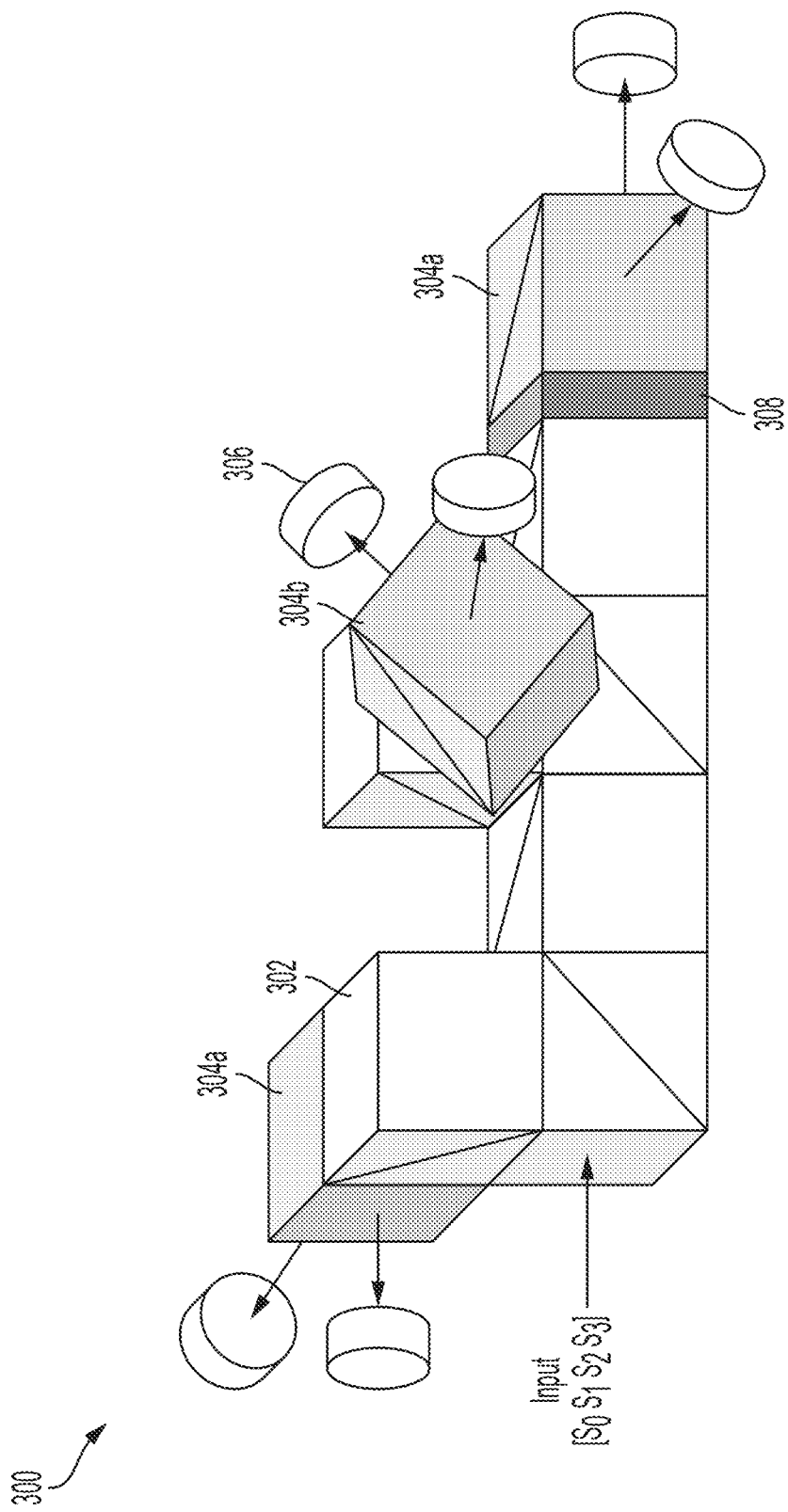
FIG. 3 is a schematic diagram of a polarimeter configured to perform a rapid measurement of the full polarization state of received photons, in accordance with some embodiments of the technology described herein.

FIG. 3 is a schematic diagram of an exemplary Stokes polarimeter 300, in accordance with some embodiments of the technology described herein. The Stokes polarimeter 300 may be implemented as polarimeter 114 in FIG. 1B, in some embodiments. The Stokes polarimeter 300 may be configured to perform high-speed measurements of input Stokes parameters $s_0$, $s_1$, $s_2$, and $s_3$, where $s_1$, $s_2$, and $s_3$ are components of the Stokes vector. The Stokes polarimeter 300 includes six beam splitters 302, three polarizing beam splitters 304a, 304b, and six optical detectors 306. It should be appreciated that in some embodiments, the six beam splitters 302 may not be present, and the three polarizing beam splitters 304a, 304b may be used alone. In some embodiments a quarter waveplate 308 may be included in Stokes polarimeter 300. The quarter waveplate 308 may be configured to cause a rotation of the input Stokes parameters such that $s_3$ may be measured.

In some embodiments, the six beam splitters 302 are arranged to split the input optical signal into three output optical signals having the same state of polarization (SOP) as the input optical signal. The three polarizing beam splitters 304a, 304b are each arranged to split one of the three output optical signals into two output optical signals. The two output optical signals from each of the polarizing beam splitters 304a, 304b may have different polarizations. In some embodiments, two polarizing beam splitters 304a of the three polarizing beam splitters may be arranged with 0° of rotation relative to the neighboring beam splitters 302. In contrast, one polarizing beam splitter 304b of the three polarizing beam splitters may be arranged to have an angle θ (e.g., 45°) of rotation relative to the neighboring beam splitter 302.

In some embodiments, each of the two output optical signals from the polarizing beam splitters 304a, 304b may be received by a corresponding optical detector 306. The optical detectors may, for example, be photodetectors. The optical detectors 306 may be arranged such that they receive incident light from the three polarizing beam splitters 304a, 304b (e.g., the optical detectors 306 may be perpendicular to a face of the respective polarizing beam splitter. Additional aspects of a polarimeter are described in "Compact and high-speed Stokes polarimeter using three-way polarization-preserving beam splitters" by S. Shibata, et. al., *Applied Optics*, Vol. 58, Issue 21, pages 5644-5649 (2019), which is incorporated by reference herein in its entirety.

Returning to FIG. 1B, facility 100 includes polarization correction console 120 communicatively coupled to the polarization correction system 110. Polarization correction console 120 may be any suitable electronic device configured to send instructions and/or information to polarization correction system 110, to receive information from polarization correction system 110, and/or to process obtained measured signals (e.g., as obtained from polarimeter 114). In some embodiments, polarization correction console 120 may be a fixed electronic device such as a desktop computer, a rack-mounted computer, or any other suitable fixed electronic device. Alternatively, polarization correction console 120 may be a portable device such as a laptop computer, a smart phone, a tablet computer, or any other portable device that may be configured to send instructions and/or information to polarization correction system 110, to receive information from polarization correction system 110, and/or to process obtained measurement signals.

Some embodiments may include a polarization correction facility 122 stored on polarization correction console 120. Polarization correction facility 122 may be configured to determine a feedback parameter configured to change a setting of polarization modulator 112 in order to alter a polarization of photons exiting polarization modulator 112. Polarization correction facility 122 may be configured to, for example, analyze a polarization obtained by polarimeter 114 to determine a difference between the measured polarization of photons after traversing optical fiber 104 and a known, initial polarization (e.g., as generated by probe photon source 102) of the photons. The polarization state of the photons, both initially and as measured after passing through polarimeter 114, may be characterized by a set of three vectors (e.g., as associated with the Poincaré sphere). The polarization correction facility 122 may be configured to determine a difference between values of vectors of each set of three vectors associated with the initial polarization and the measured polarization. Alternatively, in some embodiments the polarization state of the photons may be characterized by a single vector (e.g., as associated with the Stokes vector).

In some embodiments, polarization correction facility 122 may determine a feedback parameter to be used to change one or more settings of the polarization modulator 112 based on the determined difference between the initial and measured polarizations. The feedback parameter may be selected in order to change one or more settings of the polarization modulator 112 to reduce or eliminate the difference between the initial and measured polarizations (e.g., to reduce an error in the quantum state of the quantum data photons after traversing the optical fiber 104).

In some embodiments, the polarization correction facility 122 may use a machine learning model and/or a lookup table to determine the feedback parameter. For example, the polarization correction facility 122 may use machine learning model comprising a reinforcement learning algorithm and/or a dynamic programming algorithm to determine the feedback parameter. For example, during training, the machine learning model may be tasked with generating one or more feedback parameters, exploring a set of available feedback parameters stored in a lookup table, and generating a reward based on the initial photon polarization values and the measured photon polarization values.

In some embodiments, the lookup table may be generated prior to network use by correlating settings of the polarization modulator with induced changes to the polarization state of probe photons. For example, probe photons having two or more encoded polarization states (e.g., H, V, D, A, and/or R/L) and/or having two or more wavelengths (e.g., above and below a wavelength of the quantum data photons) may be transmitted through optical fiber 104 to polarization modulator 112. The lookup table may be generated by correlating settings of the polarization modulator with changes in the measured polarization of the probe photons having different initial polarization states and/or wavelengths at the polarization modulator.

In some embodiments, using a machine learning model to search the lookup table may increase speed and accuracy of determining the feedback parameter. For example, if the polarization modulator 112 may have $255^4$ available positions, the lookup table may comprise four different tables with $255^4$ entries, and a search to determine the feedback parameter would comprise searching through $4 \times 255^4$ entries. The machine learning model can improve the search speed and accuracy based on its training.

In some embodiments, the generated reward may be proportional to the impact the generated feedback parameter may have on stabilizing the system. For example, the trained feedback parameter(s) may be uploaded to the reinforcement learning algorithm, at which point the reinforcement learning algorithm may use the feedback parameter(s) to correct and/or preserve the polarization state of a given pair of photons. Alternatively, upon deployment of the machine learning model, the feedback parameter(s) might be retrained to best fit the environment in which the machine learning model has been deployed using its previous training data as a base for performing further training in the particular, new environment.

In some embodiments, after training the machine learning model, the polarization correction facility 122 may use the machine learning model to periodically correct photon polarization during operation of a larger quantum telecommunications system. For example, the probe photon source 102 may periodically interweave probe photons having known polarizations in between quantum data photons or groups of data photons carrying quantum information (e.g., based on time synchronization information from time synchronization module 140 or based on input from a time series forecasting model as described herein). The polarization correction system 110 and polarization correction facility 122 may change settings of the polarization modulator 112 based on measured polarizations of these probe photons. Alternatively or additionally, the probe photon source 102 may interweave probe photons in between one or more quantum data photons at periodic intervals and/or in response to a triggering event. For example, in response to an increasing rate of temperature change, the probe photon source 102 may interweave probe photons in between one or more quantum data photons, as the temperature change may alter the optical properties of the optical fiber 104 and/or other optical components in the transmission chain. As another example, the probe photon source 102 may interweave probe photons in between one or more quantum data photons in response to a measured polarization drift over a threshold value (e.g., over 5%, 10%, or 15% drift).

In some embodiments, polarization correction console 120 may be accessed by polarization correction system user 124 in order to perform maintenance on polarization correction system 110 and/or the larger quantum optical telecommunications system. For example, polarization correction system user 124 may implement a polarization correction process by inputting one or more instructions into polarization correction console 120 (e.g., polarization correction system user 124 may request an updated polarization measurement from polarimeter 114 and may implement a polarization correction process in response to said polarization measurement). Alternatively or additionally, in some embodiments, polarization correction system user 124 may implement a periodic (e.g., either at regular intervals or irregular intervals of time) polarization correction procedure by inputting one or more instructions into polarization correction console 120.

Figure 4:
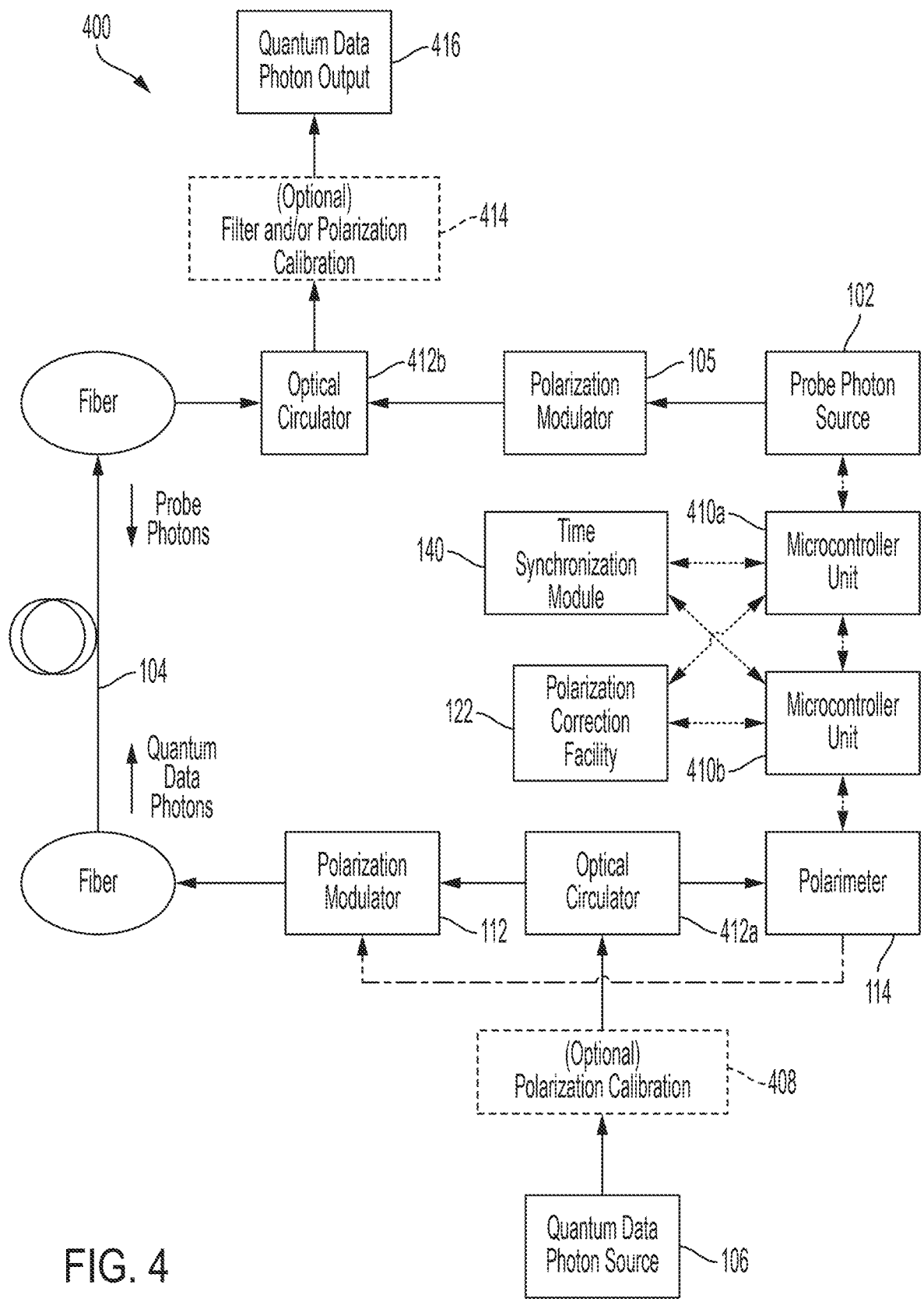
FIG. 4 is a schematic block diagram of a quantum communications system including polarization compensation and arranged such that the quantum data photons and probe photons counter-propagate along the optical fiber, in accordance with some embodiments of the technology described herein.

FIG. 4 is a schematic block diagram of a quantum communications system 400 including polarization compensation, in accordance with some embodiments of the technology described herein. The system 400 is arranged such that the quantum data photons and probe photons counter-propagate along the optical fiber 104 (e.g., the quantum data photons and probe photons traverse the optical fiber 104 in opposite directions). The system 400 may be implemented as an example of the system 100 described herein in connection with FIG. 1B.

In some embodiments, probe photon source 102 and quantum data photon source 106 may be coupled to the optical fiber 104 through optical circulators 412a and 412b. Optionally, the quantum data photons from quantum data photon source 106 may pass through polarization calibration device 408 (e.g., one or more fixed waveplates) prior to entering optical circulator 412a. Similarly, the quantum data output 416 may pass through optional filtering and/or polarization calibration 414 after exiting the optical fiber 104 and the optical circulator 412b. In some embodiments, the optional filtering and/or polarization calibration 414 may include one or more of a manual etalon, a fiber Bragg grating, a dichroic filter, or any other suitable filter, and/or one or more fixed waveplates.

In some embodiments, microcontroller units 410a and 410b may be used to facilitate the synchronized generation of probe photons by probe photon source 102 and to implement a polarization correction process using the polarization modulator 112, respectively. Microcontroller units 410a and 410b may be communicatively coupled (e.g., via a network) to time synchronization module 140 (e.g., to synchronize the sending of probe and/or quantum data photons) and/or to polarization correction facility 122 (e.g., to transmit measurements from polarimeter 114 to polarization correction facility 122).

In some embodiments, microcontroller units 410a and 410b may be communicatively coupled to one another (e.g., via a network) in order to facilitate synchronization of the polarization compensation process. For example, microcontroller unit 410b may transmit trigger information (e.g., that the polarization has drifted beyond a threshold value) to microcontroller unit 410a. Microcontroller unit 410a may then transmit instructions to probe photon source 102 and/or polarization modulator 105 to begin transmitting probe photons with a known, encoded polarization state to begin the polarization compensation process by adjusting a setting of polarization modulator 112 using a feedback parameter generated by polarization correction facility 122.

Figure 5:
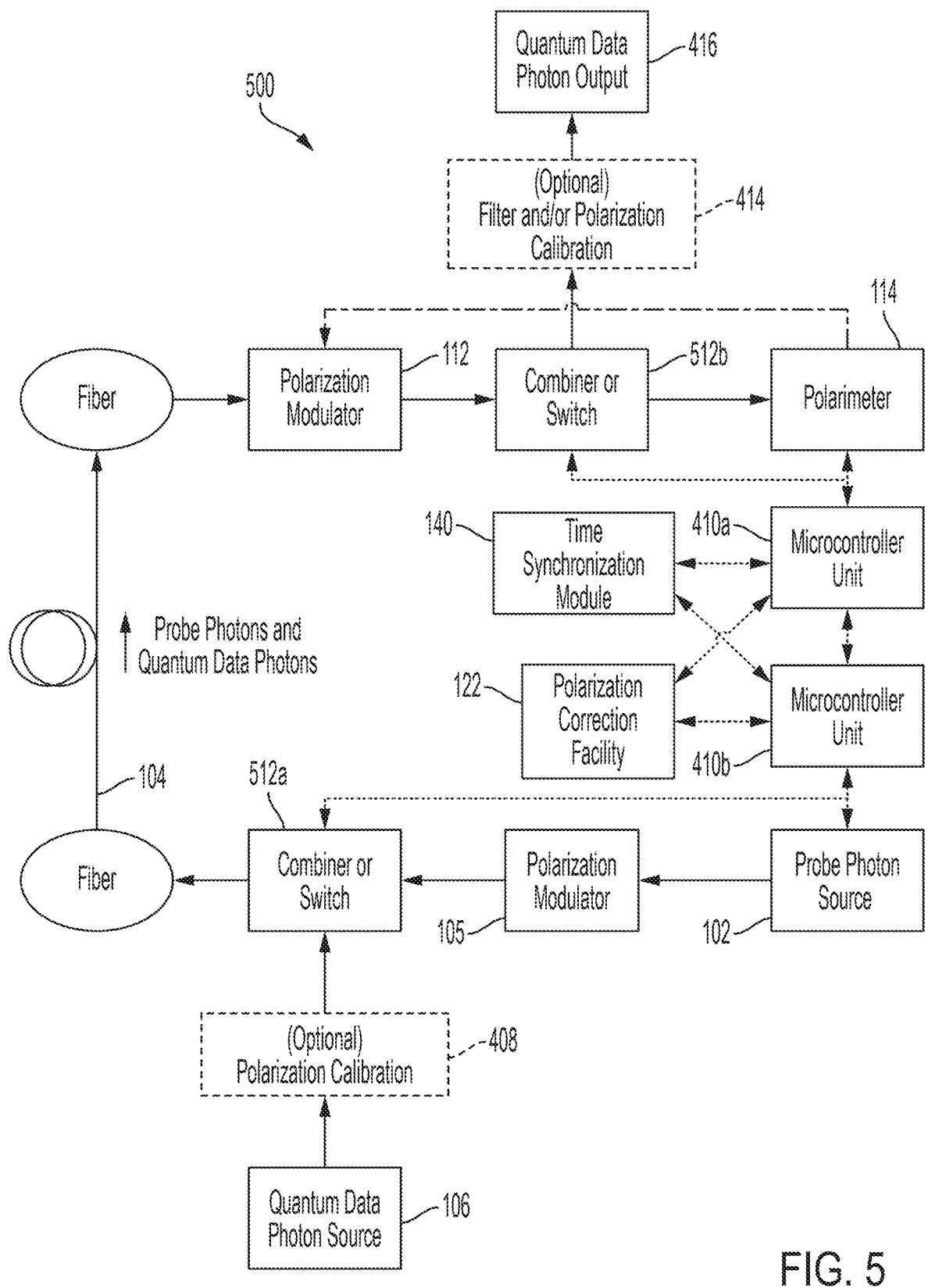
FIG. 5 is a schematic block diagram of a quantum communications system including polarization compensation and arranged such that the quantum data photons and probe photons co-propagate or counter-propagate along the optical fiber, in accordance with some embodiments of the technology described herein.

FIG. 5 is a schematic block diagram of another quantum communications system 500 including polarization compensation, in accordance with some embodiments of the technology described herein. System 500, as depicted in the example of FIG. 5, is arranged such that the probe photons and quantum data photons co-propagate along the optical fiber 104. In some embodiments, however, system 500 may be arranged such that the quantum data photons and probe photons counter-propagate along the optical fiber (e.g., by switching the position of the probe photon source 102 with that of the polarization modulator 112 and polarimeter 114).

In some embodiments, probe photon source 102 and quantum data photon source 106 may be coupled to the optical fiber 104 through combiners or switches 512a and 512b. Combiners or switches 512a and 512b may include any suitable optical combiner (e.g., a wavelength division multiplexer, a dense wavelength division multiplexer), any suitable optical splitter, or any suitable optical switch. The use of combiners or switches 512a and 512b, rather than optical circulators 412a and 412b, enables the system 500 to be configured in both co-propagating or counter-propagating arrangements.

Figure 6:
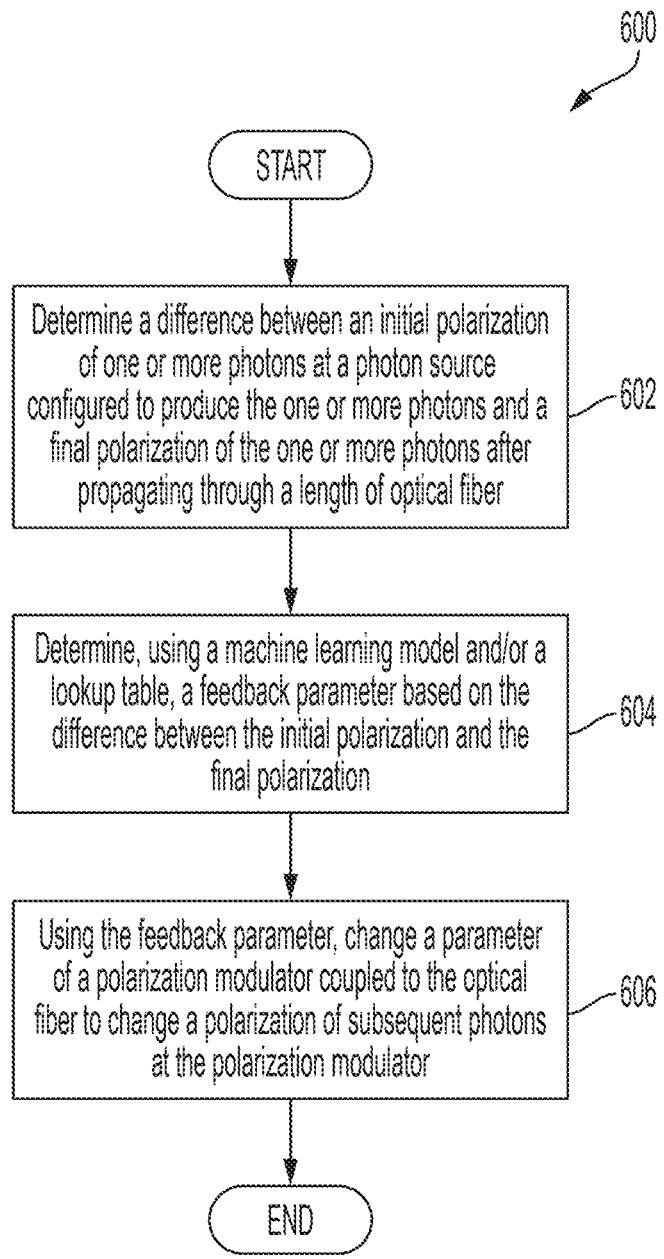
FIG. 6 is a flowchart of a process 600 for performing polarization correction, in accordance with some embodiments of the technology described herein.

FIG. 6 is a flowchart of a process 600 for performing polarization correction, in accordance with embodiments described herein. Process 600 may be implemented by a polarization correction facility, such as the polarization correction facility 122 of FIG. 1B. As such, in some embodiments, the process 600 may be performed by a computing device configured to send instructions to a polarization correction system and/or to receive information from a polarization correction system (e.g., polarization correction console 120 executing polarization correction facility 122 as described in connection with FIG. 1B). As another example, in some embodiments, the process 600 may be performed by one or more processors located remotely (e.g., as part of a cloud computing environment, as connected through a network) from the polarization correction system.

Process 600 may begin at act 602, where the polarization correction facility may determine a difference between an initial polarization of one or more photons as produced at a photon source configured to produce the one or more photons and a final polarization of the one or more photons that is measured after the one or more photons traverse a length of optical fiber. In some embodiments, the polarization may be measured by a polarimeter (e.g., polarimeter 114 as described in connection with FIG. 1B). In some embodiments, the initial and final polarizations may be each described by a set of three vectors or a set of three vector elements (e.g., as associated with the Poincaré sphere, as associated with the Stokes vector), and the polarization correction facility may determine a difference between corresponding vectors of each set of three vectors or between corresponding vector elements of each set of three vector elements. In some embodiments, the polarization correction facility may determine the difference for one or more probe photons interweaved between quantum data photons, the probe photons having a known initial polarization (e.g., H, V, D, A, and/or R/L polarization states). In some embodiments, the probe photons may be encoded (e.g., using modulator 105 described in connection with FIG. 1B) with the known initial polarization states.

After determining the difference between an initial and a final polarization of the one or more photons, the polarization correction facility may proceed to act 604. In act 604, the polarization correction facility may determine, using a machine learning model and/or a lookup table, a feedback parameter for a polarization modulator based on the difference between the initial polarization and the measured polarization of the one or more photons. The machine learning model may be, for example, a Q-learning algorithm, an Actor-Critic algorithm, or any other suitable reinforcement learning model. The machine learning model may have been trained to predict an appropriate feedback parameter or parameters configured to return the measured polarization to the initial polarization or approximately the initial polarization by changing one or more settings of the polarization modulator. The machine learning model may have been trained by, for example, a policy configured to provide feedback to the machine learning model based on an accuracy of the machine learning model's predictions.

After determining the feedback parameter, the process 600 may proceed to act 606. In act 606, the polarization correction system may change, using the feedback parameter from the polarization correction facility, a parameter (e.g., a setting) of a polarization modulator coupled to the optical fiber to alter a polarization of subsequent photons at the polarization modulator. For example, the polarization correction facility may, using electromechanically controlled motors, change a rotation of one or more spools about which a portion of the optical fiber is wound, as described in connection with the example of FIG. 2A herein. Rotating the one or more spools may apply a stress and/or strain on the portion of the optical fiber, changing a birefringence of the wound portion of the optical fiber and altering a polarization of light passing through the wound portion of the optical fiber.

As another example, the polarization correction facility may, using an electromechanically controlled motor, change a diameter of a spool about which a portion of the optical fiber is wound, as described in connection with the example of FIG. 2B herein. Changing the diameter of the spool may change a mechanical stress and/or strain on the portion of the optical fiber, thereby changing a birefringence of the portion of the optical fiber and changing a polarization of light passing through the wound portion of the optical fiber.

As a further example, the polarization correction facility may, using piezoelectric clamps, change an applied pressure on portions of the optical fiber passing through the piezoelectric clamps, as described in connection with the example of FIG. 2C herein. The polarization correction facility may change an applied pressure (e.g., changing an amount of compression) on the portion of the optical fiber by changing an electric field applied to the piezoelectric clamps. Changing the applied pressure to the portions of the optical fiber passing through the piezoelectric clamps may change a birefringence of the portion of the optical fiber and thereby change a polarization of light passing through the portion of the optical fiber pressed between the piezoelectric clamps.

Alternatively or additionally, the polarization correction facility may change an electric field applied to an optical material, as described in connection with the example of FIG. 2D herein. The optical material may be, for example, beta barium borate (BBO), lithium niobate, ammonium dihydrogen phosphate (ADP), and/or any other suitable nonlinear or linear optical material, and changing the electric field applied to the optical material may change a birefringence of the optical material, thereby changing a polarization of photons traveling along the optical fiber and through the polarization modulator. In some embodiments, the optical material may be an electro-elasto-optical (EEO) material (e.g., a biaxial crystal perovskite ternary solid solution with a morphotropic phase boundary) configured to change its birefringence in response to an applied electric field.

In some embodiments, the polarization correction facility may iteratively repeat process 600 (e.g., repeating acts 602, 604, and 606). For example, in some embodiments the one or more photons may comprise a first photon having a first polarization state and a second photon having a second polarization state different than the first polarization state. In some embodiments, the one or more photons may be four or more photons, each of the four or more photons having different polarization states. For example, the four or more photons may each be encoded with one of an H, V, D, A, and/or R/L polarization state.

In some embodiments, the polarization correction facility may iteratively repeat process 600 for each of the one or more photons having a different polarization state. In this manner, the polarization correction facility may determine suitable feedback parameters for transmitted light having different polarization states, enabling accurate polarization compensation for quantum data photons having any arbitrary polarization state.

Figure 7:
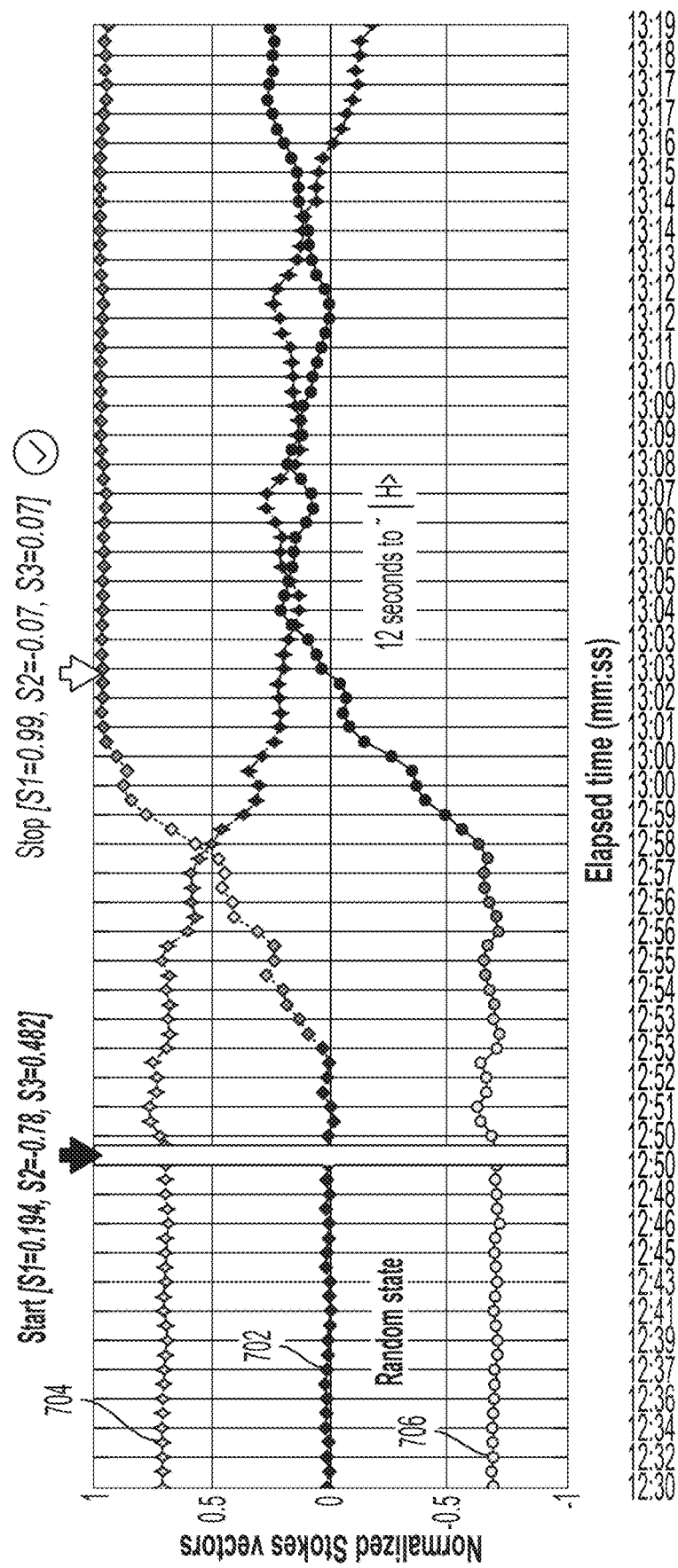
FIG. 7 shows polarization data for polarization compensation performed in response to out-of-cycle triggering events, in accordance with some embodiments of the technology described herein.

FIG. 7 shows polarization compensation data for one instance of polarization compensation, with photon transmission occurring over approximately 1 km, in accordance with some embodiments of the technology described herein. FIG. 7 shows, in curves 702, 704, and 706, the three normalized Stokes vector components $s_1$, $s_2$, and $s_3$. At left, the received photons are in an initially random SOP after passing through the optical fiber. At right, FIG. 7 shows the Stokes vector components converging to the desired |H⟩ state ($s_1=1$, $s_2=s_3=0$) in response to the applied polarization compensation. The polarization compensation process for this experimental setup took approximately 12 seconds after the triggering event ("Start").

Figure 8:
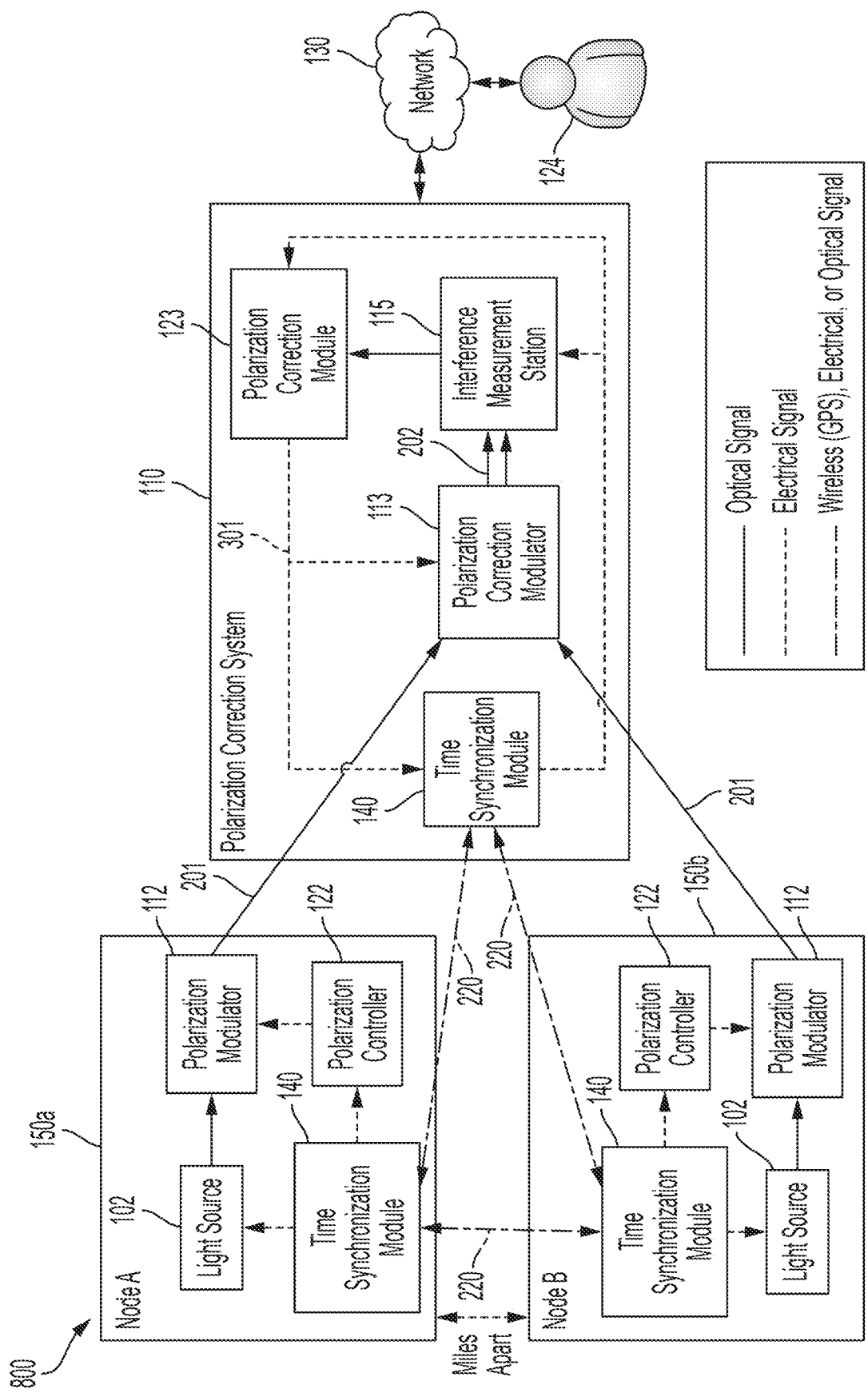
FIG. 8 is a block diagram of a facility 800 for performing time-synchronized polarization correction, in accordance with embodiments described herein.

As illustrated in FIG. 8, in some embodiments, it may be desirable to simultaneously calibrate two or more optical fiber channels with respect to one another. In this case, two nodes 150a and 150b are connected to the polarization correction system 110 by optical fibers 201. The nodes 150a and 150b may be located miles apart from each other. Each node may include a probe photon source 102, a polarization modulator 112, a polarization controller 123, and a time synchronization module 140. The probe photon source 102, polarization modulator 112, and polarization controller 123 may comprise components as described in connection with FIG. 1B herein.

In some embodiments, the time synchronization modules 140 of each node 150a and 150b may be connected through wireless channels 220 (e.g. using GPS-disciplined clocks to maintain synchronicity) or over optical fibers (e.g. using a white rabbit protocol). A synchronization signal from each time synchronization module 140 may trigger the probe photon sources 102 of each node 150a and 150b to transmit light to polarization modulators 112. A polarization controller 123, also synchronized by a signal received from time synchronization module 140, may control the polarization of the photons received from probe photon sources 102 to create photons of a known polarization.

In some embodiments, the photons of a known polarization may then be transmitted along optical fibers 201 to the polarization correction system 110. Within the polarization correction system 110, the photons may pass through a polarization correction modulator 113 and be transmitted using separate optical fibers 202 to the interference measurement station 115. The interference measurement station 115 may measure an interference pattern (e.g., a classical interference pattern or a second order interference pattern). This interference pattern may be transmitted to the polarization correction module 125, where the machine learning model (e.g., as described herein in connection with FIG. 1B) analyzes the incoming signal and creates a correction feedback signal 301 which is transmitted to the polarization correction modulator 113 and the time synchronization module 140 of the polarization correction system 110.

In some embodiments, the overall process may be controlled by a remote user 124. Instructions may be transmitted to polarization correction system 110 over a network 130. Polarization correction system 110 may utilize the connections between time synchronization modules 140 to the nodes 150a and 150b to communicate instructions from the polarization correction system 110 to the nodes. In some embodiments, this feedback and correction process can be repeated until the measured signal at interference measurement station 115 is the same or approximately the same as the defined polarization as sent from the polarization modulators 112.

The inventors have recognized that in order to make quantum telecommunications feasible for real-world use, the telecommunication network should be in operation for as much time as possible. That is, it is preferable to minimize or reduce network downtime for calibration operations such as polarization compensation. The inventors have recognized that network downtime can be reduced by increasing the speed of the polarization compensation process and by reducing the frequency of performing the polarization compensation process. The inventors accordingly have recognized that if the effect of a polarization modulator on the light's SOP may be well-modeled, a physics-based model may be used to map Stokes vector components to the polarization modulator's behavior. Additionally, the inventors have recognized that machine learning techniques (e.g., time series forecasting models) may be used to predict when the system may need polarization compensation, which could reduce network downtime relative to a system in which performing polarization compensation is done periodically according to a fixed schedule.

Accordingly, the inventors have developed methods to calibrate a transformation matrix based on the physical behavior of a specific polarization modulator device in a network. Given an input normalized Stokes vector, $S=[s_1, s_2, s_3]$, a transformation matrix for the polarization modulator device may be generated. The transformation matrix may be a 3×3 matrix that transforms a normalized Stokes vector into another vector, S', similar to the functionality of Mueller matrices. The transformation matrix may be associated with the polarization modulator's control mechanisms (e.g., electromotors, application of electric fields, etc.) to enable the transformation of an arbitrary polarization state based on such a physics-based model. Using such a model, it is possible to converge any arbitrary SOP to within 10% of the objective polarization within less than 1 second. For slow drifts of the polarization, the model may be used to "blindly" compensate and stabilize the polarization within 10% of the objective SOP without needing to take the network offline and perform polarization compensation.

The inventors have also developed methods to perform polarization forecasting using machine learning techniques. Time series forecasting is a form of machine learning that can be applied to data recorded over time to make predictions for future values based on observed values from the past ("historical data"). Forecasting models take into account patterns that repeat themselves (autocorrelation), patterns that repeat at regular intervals (seasonality), and changes in the mean and variance over time (stationarity). A time series forecasting model can accordingly be trained with respect to both regular and irregular, and short-term and long-term fluctuations in the polarization drift.

Figure 9:
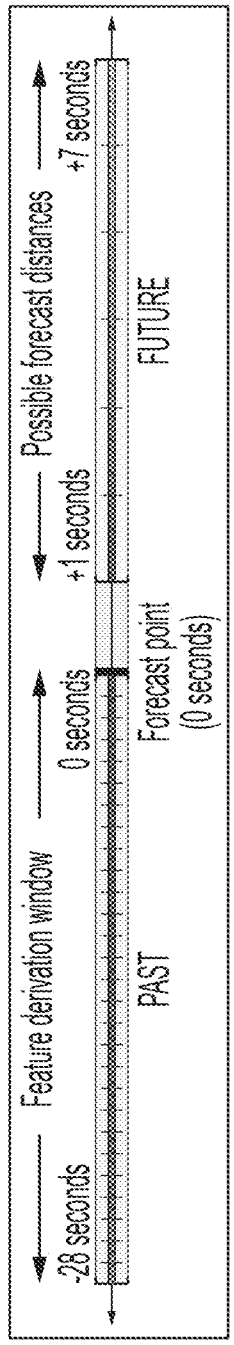
FIG. 9 is a schematic diagram describing time windows for use in time series forecasting, in accordance with some embodiments of the technology described herein.

FIG. 9 is a schematic diagram describing time windows for use in time series forecasting, in accordance with some embodiments of the technology described herein. In time series forecasting, predictions are made with respect to a certain point in time (the "forecast point"). The distance between the forecast point and the point in time in the future where the prediction is to be made is the forecast distance. The forecasting model uses features derived from a period time in the past ("feature derivation window") to make predictions of the future.

In some embodiments, to make predictions of polarization drift from a forecast point where the polarization has been measured to a future point in time, a forecasting machine learning model may be used. The forecasting machine learning model may be implemented as a part of polarization correction facility 122 (e.g., as described in connection with FIG. 1B herein). The forecasting model may be, for example, one of an autoregressive integrated moving average (ARIMA) model, a support vector machine (SVM) model, and/or an artificial neural network (ANN) model. In some embodiments, the forecasting model may be implemented according to a programmable interval (e.g., every second, every few seconds) or an adaptable interval (e.g., more frequently during rush hour due to increased traffic noise and less frequently at night).

Figure 10B:
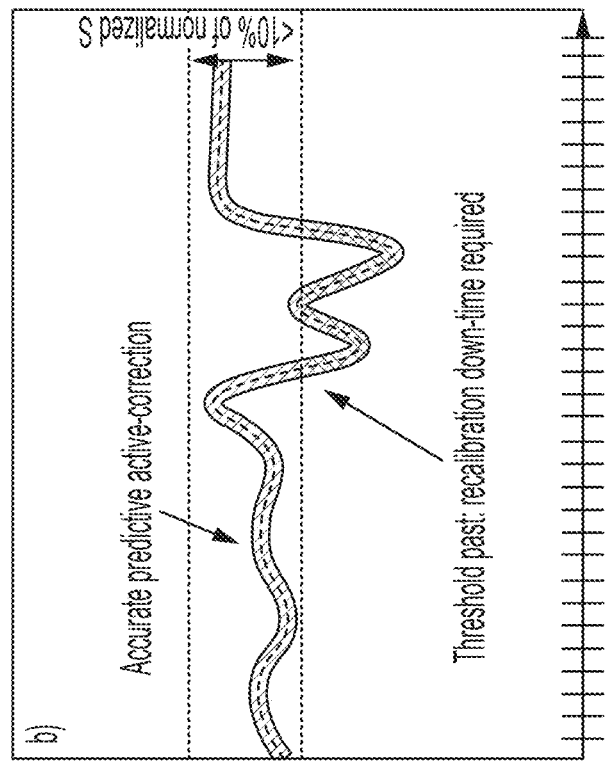
FIG. 10B shows exemplary threshold values of polarization drift over which polarization compensation may be performed, in accordance with some embodiments of the technology described herein.
Figure 10A:
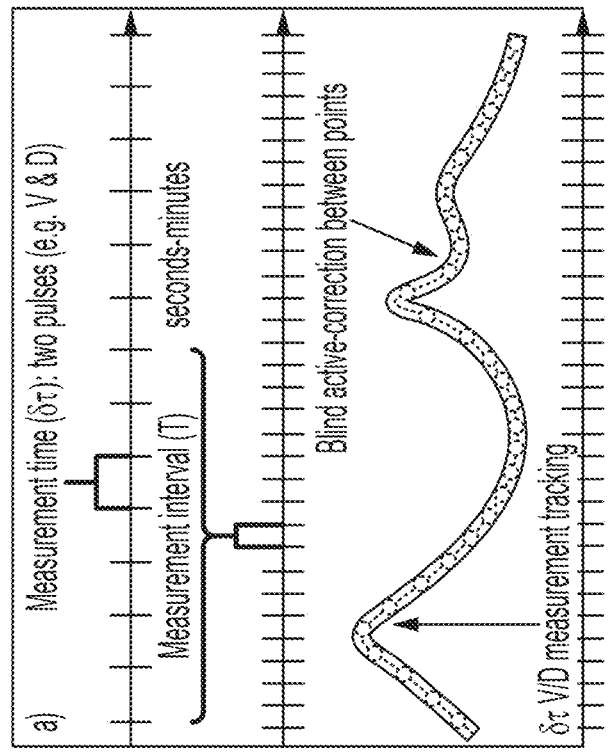
FIG. 10A shows a procedure for blind correction using a transformation matrix and a forecasting machine learning model, in accordance with some embodiments of the technology described herein.

FIG. 10A shows a procedure for blind correction using a transformation matrix and a time series forecasting machine learning model, in accordance with some embodiments of the technology described herein. For each time interval τ, a small portion of the time interval (δτ) is used for autocorrection of polarization drift in the optical fiber. In each δτ, the sender sends to the receiver H (or V) and A (or D) polarized light. The lower curve of FIG. 10A shows timed measurements during intervals δτ as points and the acceptable margins for blind correction as the shaded region around the points. No correction is performed during the intervals δτ, but if predicted polarization drift is slow (e.g., within the shaded region), blind correction may be performed in real time.

FIG. 10B shows exemplary threshold values of polarization drift over which polarization compensation may be performed, in accordance with some embodiments of the technology described herein. The dashed lines represent threshold values of polarization. If the measured polarization exceeds the threshold values, the receiver sends a signal to the sender to stop sending information (e.g., quantum data photons) and to begin polarization compensation by sending probe photons with a predetermined SOP.

Figure 11:
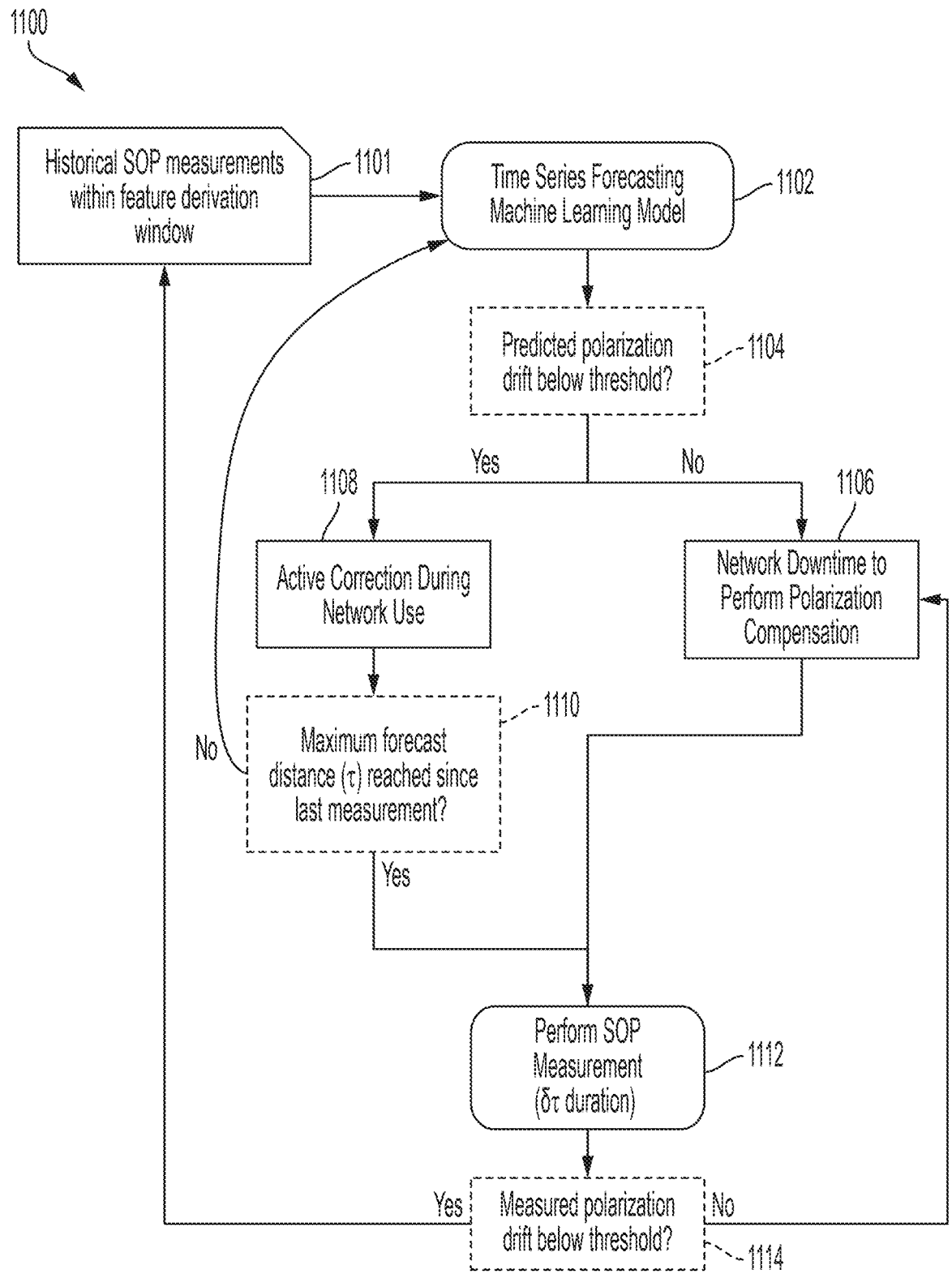
FIG. 11 is a diagram describing a process for performing time series forecasting, in accordance with some embodiments of the technology described herein.

FIG. 11 is a diagram describing a process for performing time series forecasting, in accordance with some embodiments of the technology described herein. Process 1100 may be implemented by a polarization correction facility, such as the polarization correction facility 122 of FIG. 1B. As such, in some embodiments, the process 1100 may be performed by a computing device configured to send instructions to a polarization correction system and/or to receive information from a polarization correction system (e.g., polarization correction console 120 executing polarization correction facility 122 as described in connection with FIG. 1B). As another example, in some embodiments, the process 1100 may be performed by one or more processors located remotely (e.g., as part of a cloud computing environment, as connected through a network) from the polarization correction system.

In some embodiments, the process begins by using a time series forecasting machine learning model 1102 and stored historical SOP measurements 1101 (e.g., from within the feature derivation window prior to the forecasting point in time) to predict a polarization drift within the forecasting distance. The time series forecasting machine learning model 1102 may include, for example, one of an autoregressive integrated moving average (ARIMA) model, a support vector machine (SVM) model, and/or an artificial neural network (ANN) model. The time series forecasting machine learning model 1102 may be configured to predict an amount of polarization drift within the forecasting distance (e.g., within the following second or seconds after the forecasting point).

In some embodiments, after determining the predicted amount of polarization drift, the process may proceed to decision point 1104. At decision point 1104, it may be determined whether the predicted polarization drift is below a threshold value. For example, it may be determined whether the predicted polarization drift is below a 5%, 10%, or 15% threshold value of drift. If it is determined that the predicted polarization drift is greater than the threshold value, the process proceeds to act 1106, where network downtime is needed to perform polarization compensation (e.g., using machine learning model and/or lookup table as described in connection with FIGS. 1A-8 herein).

In some embodiments, if it is determined at decision point 1104 that the predicted polarization drift is below the threshold value, then the process proceeds to act 1108. At act 1108, the process performs active correction during network use. For example, the system may perform blind polarization correction using a transformation model based on the physical properties of the polarization modulator, as described herein.

In some embodiments, after act 1108, the process may proceed to decision point 1110 to determine whether the maximum forecast distance ($\tau$) has been reached since the last forecast point measurement. If at decision point 1110 the maximum forecast distance $\tau$ has not been reached, the process may return to the time series forecasting machine learning model 1102. The time series machine learning model 1102 may then be reapplied to re-predict the polarization drift within the maximum forecast distance $\tau$.

In some embodiments, if the maximum forecast distance has been reached at decision point 1110 (e.g., if a $\tau$ period of time has passed since the last forecast point measurement), the process may proceed to act 1112 where another SOP measurement of $\delta\tau$ duration is performed. For example, the SOP measurement may be performed using polarimeter 114 as described in connection with FIG. 1B herein.

In some embodiments, after act 1112, the process may proceed to decision point 1114. At decision point 1114, the system may determine whether the measured polarization drift from act 1112 is below a threshold value. For example, the threshold value may be a 5%, 10%, or 15% drift. If the polarization drift is not below the desired threshold value, then process 1100 may return to act 1106, wherein network downtime is needed to perform polarization compensation. If the polarization drift is below the desired threshold value at decision point 1114, then the process may proceed to update the historical SOP measurements 1101 within the new feature derivation window. The process may then proceed to repeat through the described process flow during network operation.

Techniques operating according to the principles described herein may be implemented in any suitable manner. Included in the discussion above are a series of flow charts showing the steps and acts of various processes for performing polarization correction. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Ubuntu operating system, a Linux distribution developed by Canonical Ltd. based in London, the United Kingdom, or the Windows® operating system, available from the Microsoft® Corporation of Redmond, Washington. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1206 of FIG. 12 described below (i.e., as a portion of a computing device 1200) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 12:
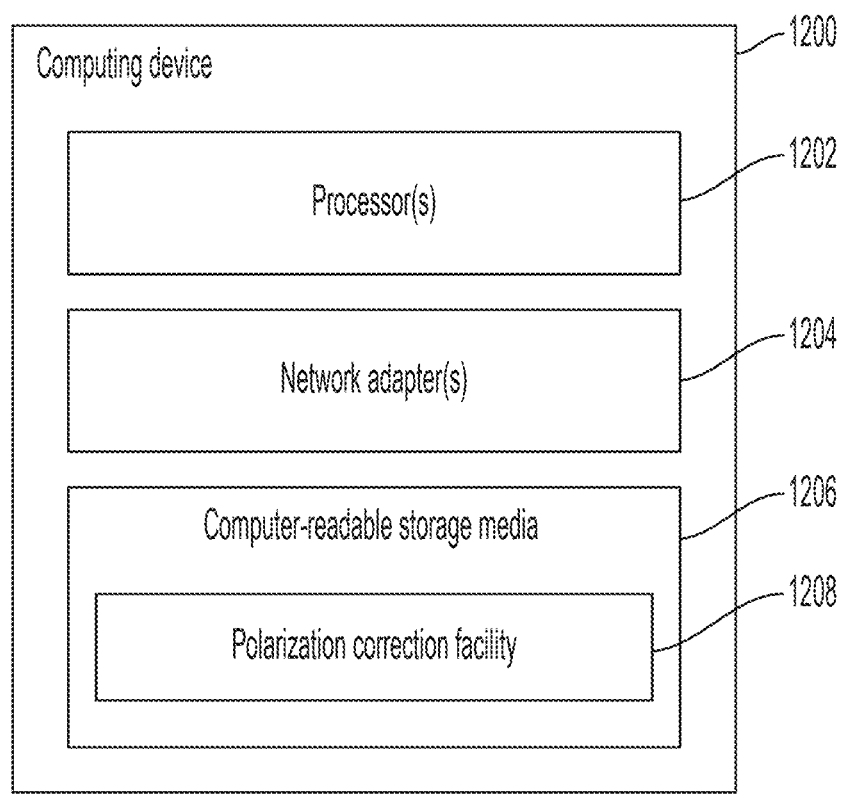
FIG. 12 is a schematic diagram of an illustrative computing device with which aspects described herein may be implemented.

In some, but not all, implementations in which the techniques may be embodied as computer-executable instructions, these instructions may be executed on one or more suitable computing device(s) operating in any suitable computer system, including the exemplary computer system of FIG. 12, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, and/or one or more Graphics Processing Units (GPUs) or any other suitable system.

FIG. 12 illustrates one exemplary implementation of a computing device in the form of a computing device 1200 that may be used in a system implementing techniques described herein, although others are possible. It should be appreciated that FIG. 12 is intended neither to be a depiction of necessary components for a computing device to operate as a console for an optical system in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a personal digital assistant (PDA), a smart mobile phone, a server, a wireless access point or other networking element, or any other suitable computing device. Network adapter 1204 may be any suitable hardware and/or software to enable the computing device 1200 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable storage media 1206 may be adapted to store data to be processed and/or instructions to be executed by processor 1202. Processor 1202 enables processing of data and execution of instructions. The data and instructions may be stored on the computer-readable storage media 1206.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store the optical cavity tuning facility 1208 and/or measured signals obtained from one or more optical cavities.

While not illustrated in FIG. 12, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

The invention claimed is:

1. A system, comprising:
   a polarization modulator optically coupled to a first photon source by an optical fiber; and
   at least one controller coupled to the polarization modulator, the at least one controller configured to:
      determine, using a machine learning model and/or a lookup table, a feedback parameter based on one or more measurements of a polarization of probe photons at a location along the optical fiber, the probe photons being generated by the first photon source; and
      using the feedback parameter, change a setting of the polarization modulator to change a polarization of quantum data photons generated by a second photon source and propagating in the optical fiber subsequent to the probe photons.

2. The system of claim 1, wherein the polarization modulator comprises a plurality of modulating components inserted sequentially along a length of the optical fiber.

3. The system of claim 2, further comprising at least one polarimeter coupled to the polarization modulator and configured to produce the one or more measurements of the polarization of the probe photons at the polarization modulator.

4. The system of claim 3, wherein the at least one polarimeter is coupled to each of the plurality of modulating components, and wherein the one or more measurements of the polarization of the probe photons comprise measurements of a polarization of the probe photons at an output of each of the plurality of modulating components.

5. The system of claim 1, wherein the polarization modulator comprises an optical material, and wherein using the feedback parameter comprises applying an electric field to the optical material to modulate a birefringence of the optical material to induce a change in a polarization of the quantum data photons in the optical fiber.

6. The system of claim 5, wherein the optical material comprises an electro-elasto-optical (EEO) material.

7. The system of claim 1, wherein the first photon source is configured to generate the probe photons such that the probe photons propagate along the optical fiber in a same direction as the quantum data photons.

8. The system of claim 1, wherein the first photon source is configured to generate the probe photons such that the probe photons propagate along the optical fiber in an opposite direction as the quantum data photons.

9. The system of claim 1, wherein the at least one controller is further configured to:
   determine a difference between an initial polarization of the probe photons as produced by the first photon source and a final polarization of the probe photons as measured at an output of the polarization modulator, and wherein,
   determining the feedback parameter based on one or more measurements of the polarization of the probe photons comprises determining the feedback parameter based on the difference between the initial polarization and the final polarization.

10. The system of claim 9, wherein the initial polarization and the final polarization are each characterized by a set of three vectors, and
   the difference between the initial polarization and the final polarization comprises a difference between vectors of each set of three vectors.

11. The system of claim 10, wherein the set of three vectors is measured by a polarimeter comprising one or more rotating waveplates and a detector.

12. The system of claim 10, wherein the set of three vectors is measured by a fixed assembly, the fixed assembly comprising:
   at least six beamsplitters;
   three polarized beamsplitters optically coupled to outputs of beamsplitters of the at least six beamsplitters; and
   pairs of optical detectors, wherein optical detectors of each pair of optical detectors are optically coupled and incident to an output of a polarized beamsplitter of the three polarized beamsplitters.

13. The system of claim 1, wherein the quantum data photons comprise at least one of a sequence of unentangled single photons and/or a sequence of entangled single photons.

14. The system of claim 1, wherein:
   the polarization modulator comprises a first polarization modulator and a second polarization modulator,
   the first photon source is optically coupled to the first polarization modulator and the second photon source is optically coupled to the second polarization modulator,
   the at least one controller comprises a first local controller, a second local controller, and a global controller,
   the first local controller is communicatively coupled to the first polarization modulator and the second local controller is communicatively coupled to the second polarization modulator, and
   the global controller is communicatively coupled to the first and second polarization modulators.

15. The system of claim 14, wherein the global controller is configured to determine the feedback parameter using the machine learning model, and
   the first and second local controllers are configured to change a setting of the first and/or second polarization modulators using the feedback parameter.

16. The system of claim 1, wherein the at least one controller is further configured to reduce downtime of the system by:

determining, using a time series forecasting model, when to initiate the steps of determining the feedback parameter and changing the setting of the polarization modulator.

17. The system of claim 1, wherein determining when to initiate the steps of determining the feedback parameter and changing the setting of the polarization modulator comprises determining when to initiate the steps based on previously-measured polarization information.

18. A method for correcting a polarization of quantum data photons, the method comprising:
   determining a difference between an initial polarization of one or more probe photons at a first photon source configured to produce the one or more probe photons and a final polarization of the one or more probe photons after propagating through a length of optical fiber;
   determining, using a machine learning model and/or a lookup table, a feedback parameter based on the difference between the initial polarization and the final polarization; and
   using the feedback parameter, changing a parameter of a polarization modulator coupled to the optical fiber to change a polarization of subsequent quantum data photons at the polarization modulator, the quantum data photons being generated by a second photon source.

19. The method of claim 18, further comprising generating, using the first photon source, the one or more probe photons such that the one or more probe photons propagate in a same direction along the optical fiber as the quantum data photons.

20. The method of claim 18, further comprising generating, using the first photon source, the one or more probe photons such that the one or more probe photons propagate in an opposite direction along the optical fiber as the quantum data photons.

21. The method of claim 18, wherein the first photon source is configured to generate the one or more probe photons on demand such that the one or more probe photons are an only optical signal in the optical fiber for a period of time.

22. The method of claim 21, further comprising regulating optical signals in the optical fiber using an optical fiber switch, a wavelength division multiplexer, and/or an optical circulator.

23. The method of claim 18, wherein the initial polarization and the final polarization are each characterized by a set of three vectors, and
   the difference between the initial polarization and the final polarization comprises a difference in one or more values of vectors of each set of three vectors.

24. The method of claim 18, wherein changing a parameter of the polarization modulator comprises changing a magnitude of an applied electric field to an optical material coupled to the optical fiber in order change a birefringence of the optical material and change a polarization of the subsequent quantum data photons.

25. A method for correcting a polarization of one or more photons, the method comprising:
   determining a difference between an initial polarization of the one or more photons at a photon source configured to produce the one or more photons and a final polarization of the one or more photons after propagating through a length of optical fiber, wherein the difference comprises a quantum bit error rate;
   determining, using a machine learning model and/or a lookup table, a feedback parameter based on the difference between the initial polarization and the final polarization; and
   using the feedback parameter, changing a parameter of a polarization modulator coupled to the optical fiber to change a polarization of subsequent photons at the polarization modulator.

* * * * *